US011360699B1

(12) United States Patent
Zhang et al.

(10) Patent No.: US 11,360,699 B1
(45) Date of Patent: Jun. 14, 2022

(54) METHOD AND SYSTEM FOR IMPROVED WRITE PERFORMANCE IN ERASURE-CODED STORAGE SYSTEMS

(71) Applicant: Veritas Technologies LLC, Santa Clara, CA (US)

(72) Inventors: Xianbo Zhang, Plymouth, MN (US); Changjun Bai, St. Anthony, MN (US); Anindya Banerjee, Maharastra (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 260 days.

(21) Appl. No.: 16/557,124

(22) Filed: Aug. 30, 2019

(51) Int. Cl.
*G06F 3/06* (2006.01)

(52) U.S. Cl.
CPC ............ *G06F 3/0656* (2013.01); *G06F 3/067* (2013.01); *G06F 3/0611* (2013.01); *G06F 3/0614* (2013.01); *G06F 3/0619* (2013.01); *G06F 3/0641* (2013.01)

(58) Field of Classification Search
CPC .... G06F 3/0614; G06F 3/0619; G06F 3/0611; G06F 3/067; G06F 3/0656; G06F 3/0641
See application file for complete search history.

(56) References Cited

U.S. PATENT DOCUMENTS

| | | | |
|---|---|---|---|
| 8,204,868 B1* | 6/2012 | Wu ..................... | G06F 16/1748 707/693 |
| 9,021,296 B1 | 4/2015 | Kiselev et al. | |
| 9,946,486 B1* | 4/2018 | Clifford ................. | G06F 3/067 |
| 2004/0111557 A1 | 6/2004 | Nakatani et al. | |
| 2010/0153347 A1 | 6/2010 | Koester et al. | |
| 2017/0351743 A1 | 12/2017 | Jayaraman et al. | |
| 2019/0073152 A1* | 3/2019 | Nagle ................... | H04L 9/0894 |
| 2019/0188098 A1 | 6/2019 | Gupta et al. | |
| 2019/0354433 A1 | 11/2019 | Mehra et al. | |
| 2020/0349110 A1 | 11/2020 | Shveidel et al. | |

OTHER PUBLICATIONS

Banerjee, Anindya, et al.: "Methods and Systems For Efficient Erasure-Coded Storage Systems," U.S. Appl. No. 17/140,108, filed Jan. 3, 2021; consisting of Specification, Claims and Abstract (xx pages); and Drawings (xx sheets).

(Continued)

*Primary Examiner* — Than Nguyen

(57) ABSTRACT

Methods, computer program products, computer systems, and the like are disclosed that provide for improved write performance in erasure-coded storage systems in an efficient and effective manner. These can include identifying a data segment, identifying metadata, persisting the data segment to a storage system, storing the metadata in the journal, and persisting the metadata to the storage system. In such embodiments, the metadata is associated with the data segment by virtue of the metadata comprising a fingerprint of the data segment. Further, in such embodiments, the persisting the data segment to the storage system is performed without storing the data segment in a journal, and the storage system is an erasure-coded storage system.

20 Claims, 18 Drawing Sheets

(56) References Cited

OTHER PUBLICATIONS

Chan, Jeremy C.W., et al.; "Parity Logging with Reserved Space: Towards Efficient Updates and Recovery in Erasure-Coded Clustered Storage,"; The Chinese University of Hong Kong; https://www.usenix.org/conference/fast14/technical-sessions/presentation/chan, 12th USENIX Conference on File and Storage Technologies (FAST '14), Feb. 17-20, 2014, Santa Clara, CA, USA, ISBN 978-1-931971-08-9, pp. 163-176.

Rashmi, K.V., et al.; "A "Hitchhiker's" Guide to Fast and Efficient Data Reconstruction in Erasure-coded Data Center," UC Berkeley, Facebook, SIGCOMM '14, Aug. 17-22, 2014, Chicago, USA 12 pages.

Operating Systems [Version 1.01], "Crash Consistency: FSCK and Journaling," www.ostep.org, Chapter 42, 2008-19, pp. 1-21.

Plank, James S., "Erasure Codes for Storage Systems", A Brief Primer, www.usenix.org, Dec. 2013, vol. 38 No. 6, pp. 44-51.

Subedi, Pradeep, "Exploration of Erasure-Coded Storage Systems for High Performance, Reliability, and Inter-operability", Virginia Commonwealth University, VCU Scholars Compass, Theses and Dissertations, Graduate School, Aug. 2016, 131 pages.

Lee, E., et al.: "Shortcut-JFS: A Write Efficient Journaling File System for Phase Change Memory," 2012 IEEE 28th Symposium on Mass Storage Systems and Technologies (MSST), 2012, pp. 1-6.

Zhang, X., et al.: "Optimizing File Systems With a Write-Efficient Journaling Scheme on Non-Volatile Memory," IEEE Transactions on Computers, vol. 68, No. 3, pp. 402-413, Mar. 1, 2019.

* cited by examiner

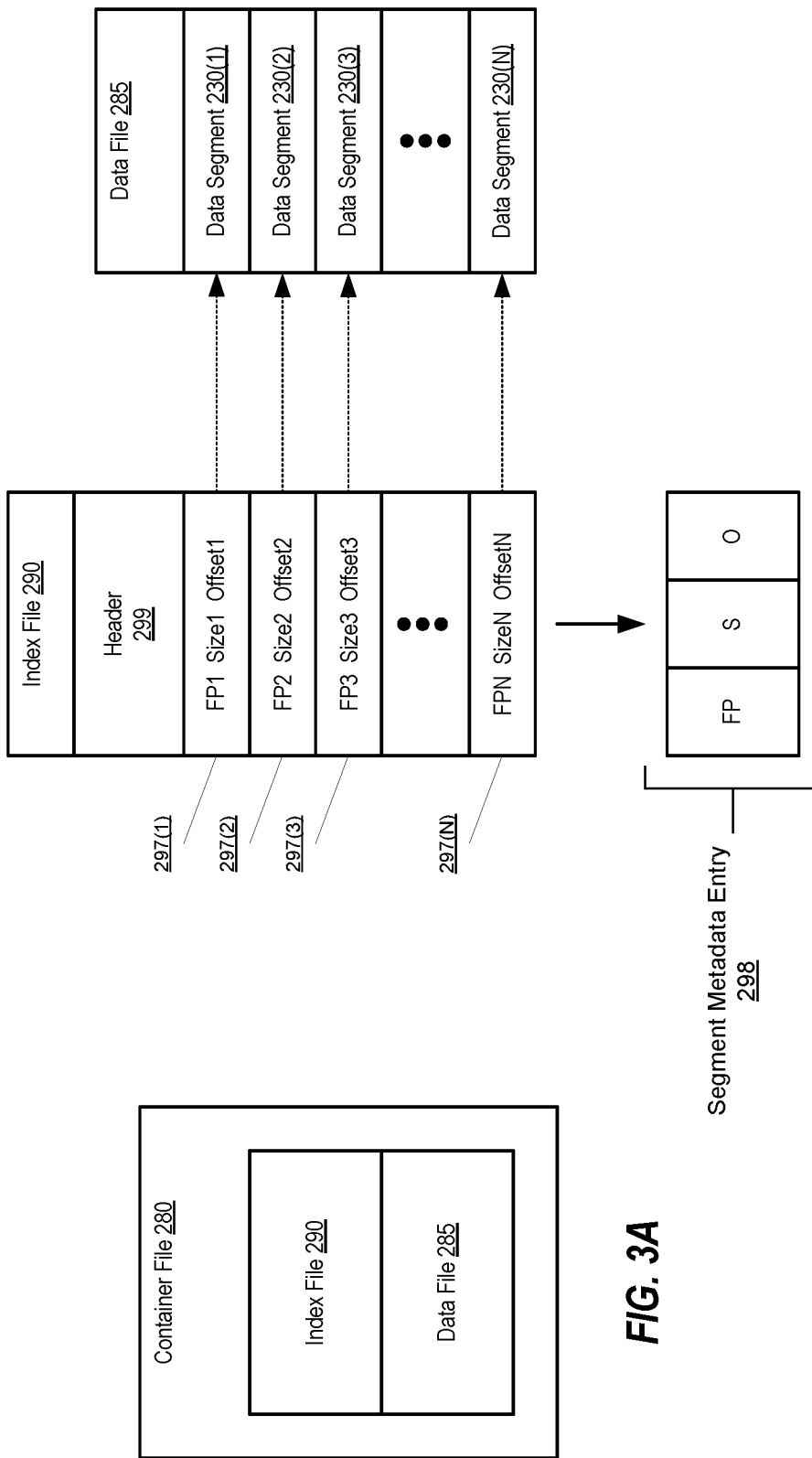

METHOD AND SYSTEM FOR IMPROVED WRITE PERFORMANCE IN ERASURE-CODED STORAGE SYSTEMS

FIELD OF THE INVENTION

The present disclosure relates to the backup of data, and more particularly, to methods and systems for improved write performance in erasure-coded storage systems.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, only one copy of that unit of information will be stored in a deduplicated backup storage volume. Similarly, if the unit of information does not change during a subsequent backup, another copy of that unit of information need not be stored, so long as that unit of information continues to be stored in the deduplicated backup storage volume. Data deduplication can also be employed outside of the backup context, thereby reducing the amount of information needing to be transferred and the active storage occupied by duplicate units of information.

SUMMARY

The present disclosure describes methods, computer program products, computer systems, and the like are disclosed that provide for improved write performance in erasure-coded storage systems in an efficient and effective manner. Such methods, computer program products, and computer systems include identifying a data segment, identifying metadata, persisting the data segment to a storage system, storing the metadata in the journal, and persisting the metadata to the storage system. In such embodiments, the metadata is associated with the data segment by virtue of the metadata comprising a fingerprint of the data segment. Further, in such embodiments, the persisting the data segment to the storage system is performed without storing the data segment in a journal, and the storage system is an erasure-coded storage system.

In one embodiment, the method further includes determining whether the data segment is a duplicate data segment, updating existing metadata stored in the journal (in response to the data segment being the duplicate data segment), and, in response to the data segment not being the duplicate data segment, performing the persisting of the data segment, the storing of the metadata, and the persisting of the metadata, where the existing metadata is associated with an existing data segment.

In another embodiment, the method further includes the persisting the data segment to the storage system storing the data segment in a container data file and the persisting the metadata to the storage system storing the metadata in a container metadata file.

In such an embodiment, embodiments can include opening the container data file and appending the data segment to the container data file. The appending comprises writing the data segment. The writing the data segment starts at an erasure-coded stripe boundary of the erasure-coded storage system within the container data file.

In such an embodiment, the storage system can be an erasure-coded storage system. The container data file can be stored in the erasure-coded storage system such that the container data file begins at an erasure-coded stripe boundary of the erasure-coded storage system. The persisting of the data segment stores the data segment at an erasure-coded stripe boundary of the erasure-coded storage system within the container data file.

In such an embodiment, embodiments can include updating a container metadata file header of the container metadata file, where a storage size of the container metadata file header is equal to a sector size of the storage system. Further, such embodiments can also include persisting the container metadata file header into the container metadata file.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

FIG. 3A is a simplified block diagram illustrating an example of the composition of a container file, according to embodiments of methods and systems such as those disclosed herein.

FIG. 3B is a simplified block diagram illustrating an example of the composition of index file, according to embodiments of methods and systems such as those disclosed herein.

Figure 1:
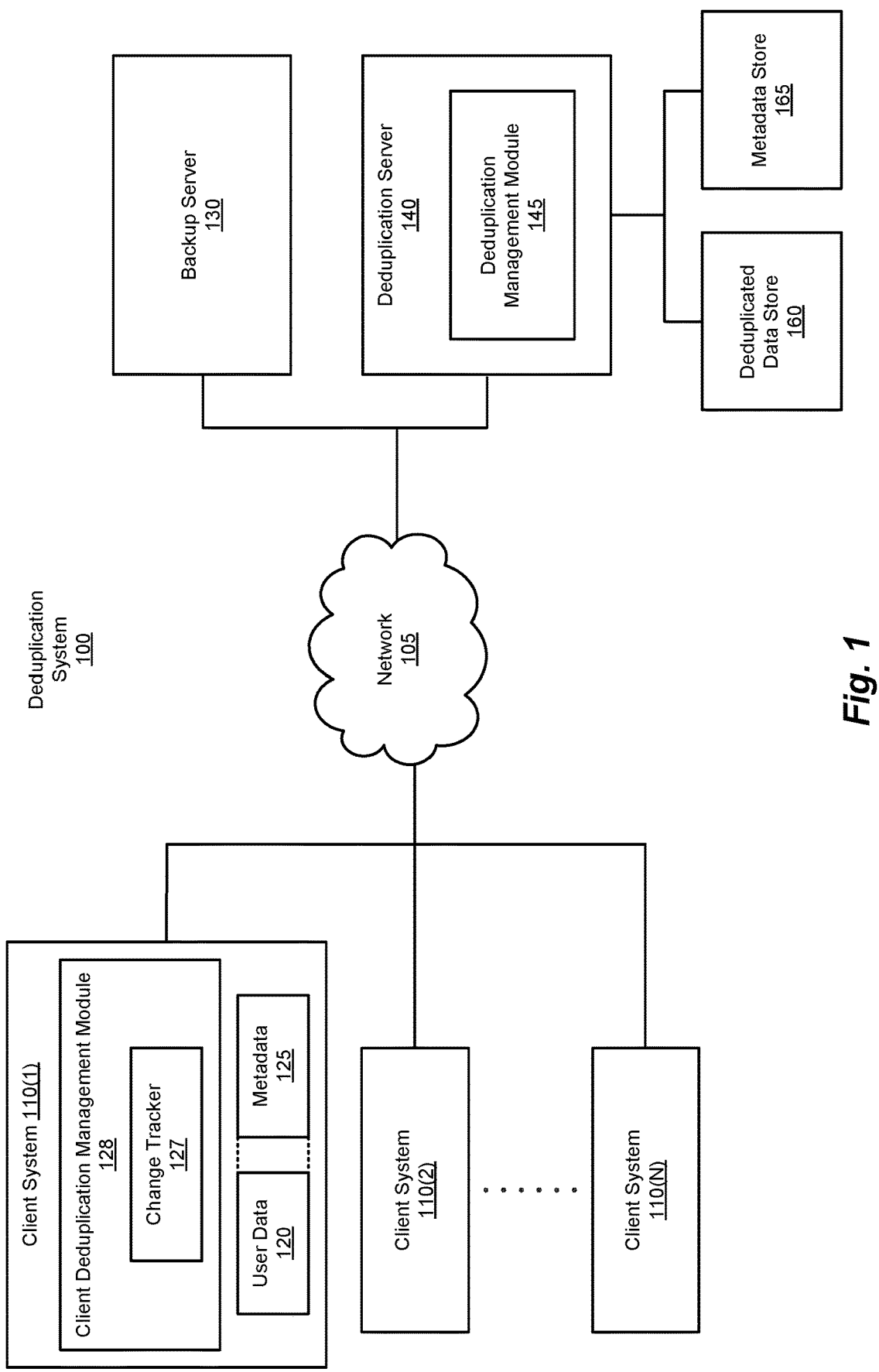
FIG. 1 is a simplified block diagram illustrating components of an example of a deduplication system, according to embodiments of methods and systems such as those disclosed herein.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover all modifications, equivalents and alternatives falling within the spirit and scope of methods and systems such as those described herein, as defined by the appended claims.

DETAILED DESCRIPTION

Introduction

Broadly, the concepts described herein are applicable to the backup of data, and more particularly, to methods and systems for improving write performance in erasure-coded storage systems. More specifically still, methods and systems such as those described herein provide flexible, efficient, and effective techniques for improved write performance in an erasure-coded storage system, while maintaining the integrity of such data (e.g., in the face of errors and data loss). Methods and systems such as those described herein accomplish such objectives by performing storage operations that take into account characteristics of the information being stored (e.g., metadata or data) to store such information in an erasure-coded storage system quickly and efficiently.

In one embodiment, for example, such methods and systems are employed to provide improved performance when storing deduplicated data backups in erasure-coded storage. As will be appreciated, data deduplication is a technique for reducing the amount of storage needed to store information by dividing such information into chunks and eliminating duplicates thereof. In the deduplication of data backups, such chunks are referred to as data segments. Such data segments can be identified by a sufficiently-unique identifier of the given data segment (the sufficiency of the identifier's uniqueness being an acceptably low probability of unique data segments mapping to the same identifier).

As will be appreciated, such fingerprints can be generated by, for example, a fingerprinting algorithm, which is an algorithm that maps a data segment to a smaller data structure (e.g., of shorter length), referred to generically herein as a fingerprint. A fingerprint uniquely identifies the data segment and is typically used to avoid the transmission and comparison of the more voluminous data that such a fingerprint represents. For example, a computing system can check whether a file has been modified, by fetching only the file's fingerprint and comparing the fetched fingerprint with an existing copy. That being the case, such fingerprinting techniques can be used for data deduplication, by making a determination as to whether a given unit of data (e.g., a file, portion there of (e.g., a data segment), or the like) has already been stored. An example of a fingerprint is a hash value. Hashing algorithms such as Message-Digest Algorithm 5 (MD5), Secure Hash Algorithm 1 (SHA-1), and Secure Hash Algorithm 256 (SHA-256) and the like can be used to generate hash values for use as fingerprints.

The function of a hashing algorithm is a function that can be used to map original data of (what can be arbitrary) size onto data of a fixed size, and in so doing, produce a value (a hash value) that is unique (with a sufficiently high level of confidence) to the original data. The input data is typically referred to as the "message" and the hash value is typically referred to as the "message digest" or simply "digest."

During a backup, clients and/or computing systems may present duplicate data within a set of data that is to be backed up. In addition, if a set of data is backed up multiple times, the data that is unchanged also results in duplicates of previously backed up data. In order to prevent backing up duplicate data from one or more clients, backup systems can implement deduplication, which removes duplicate copies of data while keeping track of how the stored unique data is being referenced. Deduplication can be used not only to preserve storage space when backing up data from client systems, but also avoids the unnecessary transfer of duplicate data.

As will also be appreciated, hardware failure is not an entirely uncommon event in today's information processing systems. Also not infrequently, the cause of such hardware failures is related to the storage systems in which such information is maintained. In light of such challenges, data protection has always been, and indeed, continues to be an important consideration in the reliable operation of such information processing systems. Traditionally, for online/operational data, different technologies (e.g., redundant array of independent disks (RAID) storage systems or mirroring/replication storage systems) have been employed to provide fault tolerance. Mirroring provides one or more full redundant copies of the data being protected, with virtually no performance impact, but suffers from a significant increase in storage consumption. Alternatives to mirroring include various levels of RAID storage systems (e.g., RAID4, RAID5, RAID6, and the like), which provide fault tolerance to a degree that is similar to that provided by mirroring storage systems. While such RAID storage systems are able to provide such fault tolerance with less storage than that needed by a storage system employing mirroring, RAID storage systems are limited with respect to the level of fault tolerance such technologies can provide (essentially being limited to a 2× level of fault tolerance). Thus, as such systems increase in scale, the ability to withstand more than two storage subsystem failures becomes an increasingly pressing issue.

To address such limitations, erasure coding can be employed to both provide a desired level of fault tolerance, and to do so with less storage than might otherwise be required. Erasure coding is a forward error correction technique for data protection that adds redundant coding information to the original data and then encodes their combination such that the original data is recoverable, even if a portion of the encoded data is unavailable (e.g., due to a failure of some sort). To do so, and erasure code transforms the original data of k data chunks into a larger amount of data (the encoded data) with m symbols such that the original message can be recovered from a subset of the m encoded data chunks.

For example, k chunks of original data is erasure coded into k+m chunks of encoded data. In general, when erasure coding is employed, the addition of m redundant data chunks provides fault tolerance of up to m lost data chunks (i.e., the original data ($D_1 \ldots D_k$) is recoverable, so long as no more than any of m data chunks of the encoded data chunks have faulted). Such a system is referred as a (k, m) erasure-coded system. Erasure codes are compared, primarily, based on two properties.
1. Whether the code is systematic or no-systematic. A systematic code keeps the original data in clear form, while a non-systematic code encodes the original data.
2. Whether the code is MDS (Maximum Distance Separable) or non-MDS. If m redundant data chunks are used for erasure coding and the original data is recoverable even with the loss of any m coded data chunks, it is MDS. Otherwise, the erasure code is non-MDS. Thus, this aspect of erasure coding essentially hinges on the erasure code's level of efficiency with respect to storage requirements of the code. In this regard, storage efficiency comes at the cost of performance, and so is a trade-off between MDS and non-MDS erasure codes.

Examples of some erasure codes used in storage systems include:
Reed-Solomon (RS) codes, which are systematic and MDS.
Local Reconstruction codes with RS, which are systematic and Non-MDS, and tend to perform better than pure RS codes, as less computation needed for encoding/decoding.
Tornado Codes, which are systematic and Non-MDS, and provide high-performance, but are not as storage-efficient.

To illustrate the operation of erasure codes, a simple example is as follows. Let x be a first data chunk and y be a second data chunk, which are to be encoded and stored. In this example, the following equations are used to perform the encoding:

$$p_1 = x + y$$

$$p_2 = x + 2y$$

The following data chunks are thus stored: x, y, $p_1$, and $p_2$. These data chunks are each stored on a corresponding, independent storage system (e.g., a storage node such as a solid state device, a hard disk drive, a network-attached storage device, or other such independent storage system). While the foregoing equations are greatly simplified for purposes of this example, it will be appreciated that, the availability of any two of the four independent storage systems would allow for the recovery of the two original data chunks.

In light of the foregoing, it will be apparent that the level of redundancy needed to provide a desired level of fault tolerance can be determined using a metric referred to as reception efficiency. Reception efficiency can be calculated as:

$$RE = ((k+m)/k)$$

Thus, given any k data chunks to encode, a set of M linear equations for computing additional code symbols can be constructed, resulting in m additional data chunks. Assuming, as is the case, that the linear equations are chosen such that any M taken together are linearly independent, if any N of these symbols are lost, M equations in m variables will still be available, and so produce a unique solution. As a result, the original data (k) can be recovered. It will therefor be appreciated that the number of data chunks that can be lost can be selected in this manner, and so the amount of storage required support a given level of fault tolerance.

Further, such an approach uses significantly less storage than other techniques, for that level of fault tolerance. For example, a (5, 3) erasure encoded storage system can withstand up to three faults and still provide for the recovery of the original data. Such a storage system would consume, using 1 TB independent storage systems as an example, 8 TB of storage. By market contrast, a mirrored storage system providing the same level of fault tolerance would employ 4 copies of the original data, and so consume 20 TB of storage. The advantage of erasure coding in such comparisons increases exponentially with further increases in the level of fault tolerance.

Foregoing techniques are of particular interest in hyper-converged infrastructure (HCI) applications. Hyper-converged platforms can include, for example, a hypervisor for virtualized computing, software-defined storage, and virtualized networking, essentially virtualizing the elements of what has historically been hardware-based infrastructure. Advantageously, such systems are typically capable of being implemented using standard, off-the-shelf servers. Multiple nodes can be clustered together to create pools of shared compute and storage resources, designed for convenient consumption. As will therefor be appreciated, the ability to add what is essentially generic infrastructure by simply adding such nodes is attractive to today's consumer of computational and storage resources. With regard to embodiments such as those described herein, HCI for use in, for example, the backup of such software-based (i.e., virtualized) systems is attractive. That said, it will be appreciated that, in light of present disclosure, techniques such as those described herein are advantageous in any situation in which certain portions of the information to be stored are, in relative terms, small, while other portions thereof are, also in relative terms, large. Further, such techniques are advantageous in scenarios in which certain data, having been persisted, is at risk of corruption by the failure of the subsequent storage operations in such environments.

Despite their desirability, such HCI environments are not without their problems. For example, such systems can put data at risk during storage operations as a result of subsequent storage operations that affect (e.g., corrupt) earlier storage operations. Further, such storage operations can encounter an unacceptably large increase in overhead in addressing such risks. With respect to erasure-coded storage (ECS), the prevention of data loss/corruption in the event of node/drive failure failures during ECS stripe update, data written to a file created in an erasure-coded volume is can be journaled on disk, and then applied to the file. Unfortunately, this results in the same data being written twice: writes into a journaling log and, subsequently, writes to ECS. This significantly reduces the overall system throughput.

To address such issues, methods and systems such as those described herein separate data to be stored into two categories: information that can be journaled (e.g., as a result of its size and nature) and information that should not be journaled (e.g., as a result of its size and nature). For example, one situation in which such disparities exist between types of information is the relationship between data and metadata. As will be understood, metadata is, typically, substantially smaller than the data it describes, given that such metadata comprehends only certain aspects of the data described thereby. An example of an environment in which data and metadata might coexist, and so give rise to the need for the storage of both types of information in the storage system employed, is that of a deduplicated backup system, in which data is divided into pieces (e.g., referred to herein as "data segments") and only unique ones of those pieces stored. In order to keep track of information regarding such data segments, metadata (in the form of data segment metadata, or more simply segment metadata) is maintained. In a situation in which such data and its associated metadata (or data and associated metadata comparable thereto) are to be maintained in an ECS system, the metadata can be maintained in a journal and then stored in a transactional fashion (and so, in a manner in which the operation can succeed or fail as a single operation, without untoward effects on other such transactions (whether occurring before or after)), while its associated data is not journaled while being stored in a transactional fashion, as well. In so doing, and using techniques described subsequently, the storage of backup information, for example, that includes metadata and data can be performed in ECS storage, while ensuring the data integrity of both the backup and any previous backups in the event of failures such as node/drive failures.

For example, and as will be explained in detail subsequently, a backup system such as that contemplated by the present disclosure has two types of data for each data segment (portion of data that serves as the basis for deduplication): metadata and data. Such metadata can include information such as, for example, a segment fingerprint for the data segment, the size of the data segment, location information for the data segment, as well as other information (e.g., checksum information, compression information, encryption algorithm information, and so on). The data of the data segment is the actual data being backed up (also referred to herein as original data). Data segments and their corresponding segment metadata are, in one embodiment, grouped into data containers. Such data containers may be based on the source of the backup data in question, thereby providing better locality.

In one embodiment, each such container is composed of one container metadata file that includes segment metadata information, and one container data file that includes the backed up data. As will be appreciated from the present disclosure, the container metadata file and the container data file can have significantly different patterns of reading and writing. For example, operations on a container metadata file can include in-place updates (where the metadata for a given data segment is updated) and append operations (in which metadata is appended into the container metadata file). By contrast, operations on a container data file can be limited to only append operations.

It is therefore to be understood that, when appending a span of data (a data span; for example, multiple data segments making up a set of data segments) to an existing container data file (which can be desirable, for example, to avoid the creation of numerous (relatively small) container data files):

1) the existing container file is opened to append the new data span; and
2) the new data span appended starting at the erasure-coded stripe boundary, with the writing of the data span's first data segment starting at the erasure-coded stripe boundary, and each subsequent data segment being written contiguous with the preceding data segment.

Thus, when a container data file is created or opened to append more data, the data segments are written starting at the stripe boundary, and then continuously appended (written) to the container data file in k stripe units, until the last data segment is written. As will be appreciated in light of the present disclosure, this last-written data segment may not fill the entire $k^{th}$ stripe unit. Thus, for a given data segment of such a set of appended data segments that is within the data span, such a given data segment may or may not start at an erasure-coded stripe boundary.

In order to improve the performance of such operations, a distinction can be made based on whether the operation is to be performed on a container data file or a container metadata file. For example, as noted, the append-only operations performed on a container data file can be performed without journaling. In so doing, the added overhead of journaling for such large amounts of data can be avoided. By contrast, operations on container metadata files (which include update operations and append operations) can be performed with journaling enabled. Given the relatively small amount of information involved, such journaling carries with it a relatively insubstantial amount of overhead.

Further, however, there is the issue in certain implementations that employ EC storage that remain to be addressed. Such issues can be addressed in the following manner:

First, a system philosophy referred to herein as a backup transaction concept is implemented, in order to ensure backup data integrity is maintained, even if data loss/corruption occurs in the EC volumes that have journaling disabled (e.g., as a result of storing container data files). Such a storage system can implement a transaction concept (i.e., transactionally-based operations) to write data segments into a container data file and write corresponding segment metadata into a corresponding container metadata file in append-only fashion. At the beginning of the container metadata file, a header is maintained to record the valid number of segments in the container metadata file. The number of valid segments is updated to reflect the newly-appended data segments only after both new segment data writes in the corresponding container data file and the new segment metadata writes are persisted to EC storage. Once the header update is persisted, the transaction is a success (such header updates can be made atomically, for example, by using a header size to a storage sector size). Before the transaction is a success, any new segments in the container data file and corresponding segment metadata in the container metadata file are not counted as valid and the loss of the new data to the container data file in the EC volume with journaling disabled does not cause any data loss to the backup storage system.

As is described in further detail subsequently, embodiments such as those described herein also avoid the allocation of storage space in the same EC stripe to different container data files. This can be achieved, in certain embodiments, by setting the filesystem's minimum unit of storage to an integer number of EC stripes (or, in other words (and as is referred to herein), a length that is k stripe units long, where k is an integer). For example, in certain file systems using storage extents (or more simply, "extents"), a minimal extent size configured to be equal the EC stripe units, which avoids the provision of storage space from the same EC stripe for allocation to more than one container data file. Otherwise, a container data file removal may trigger updating an EC stripe and, in the case of the failure of such an update (e.g., a node/drive fails), data loss/corruption may occur, as only part of the EC stripe units (also referred to herein as "chunks") may be updated. Such a failure would lead to a situation in which the existing portion of the EC stripe is unharmed (and so should not be subjected to an EC encoding operation), while the ECS system would proceed with such operations as a result of the failure. Such a situation would (or at least could) result in the corruption of the existing portion of the EC stripe.

Another consideration in such implementations is that, when using EC storage, appending data segments to a container data file should be performed on an EC stripe boundary after opening an existing container data file to append additional data segments. When a backup completes, data in a container may have not reached a preconfigured size, but the container data file is closed, notwithstanding. In order to minimize the number of containers (and so, system performance), container data files may be reopened to append more data segments (e.g., when backups from the same data source are received). However, when a container data file exists in an EC volume with journaling disabled, re-opening a container data file to append data segments may cause data loss or corruption, as a result of the new data write triggering the updating of an existing EC stripe filled with partial data. This may cause some space in an EC stripe to remain unused and lead to some "holes" in the given EC stripe. However, such gaps in the storage of data segments in a container data file stored in EC storage does not cause any read issue with backup software, as segment metadata in a container data file records the start byte to start to read a data segment and the length of the segment. With regard to container space reclamation, either a container data file may be removed, or a compaction operation may read segments still in use by some backup images and write them into a new container data file (plus, in some embodiments, certain file operations such as file renaming). As will be appreciated from the present disclosure, such operations do not cause any issues, because such operations are transactional in nature, and so will succeed or fail as a single transaction.

Example Deduplication Architecture

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of the user data 120 may also be transferred to backup server 130 and/or deduplication server 140 via a network 105 to be included in deduplicated data store 160, and the associated metadata (e.g., metadata 125). Each of client systems 110 can send different user data and metadata to backup server 130 and/or deduplication server 140.

Metadata 125 can include data about the user data 120. Metadata 125 can be generated by client system 110(1), such as during a backup process. Whenever a user (e.g., an application or human user) requests that client system 110 add all or part of user data 120 to the deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to the deduplicated data store 160, as further discussed below).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between the backup server 130 and deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present invention, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that includes various metadata regarding the deduplicated data stored in deduplicated data store 160, such as information regarding backup images stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

The various metadata (including metadata 125) can be stored in, among other locations, a central index. For example, deduplication server 140 can use metadata 125, such as the list of signatures from client systems 110, to determine if portions of a backup image (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage unit. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can include a signature associated with each unique segment stored in the container, or alternatively can include a shortened version of the signature of each unique segment stored in the container. Deduplication server 140 can maintain information identifying a container (e.g., a container identifier (a "container ID") of the container) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backup images can be stored in the deduplicated data store 160. For example, a first backup image can be captured from user data 120 and can be stored in deduplicated data store 160. A subsequent backup image captured from user data 120 can include duplicate portions that are identical to portions of the first backup image already stored in deduplicated data store 160 and can include unique portions that are not identical to portions of the first backup image (e.g., portions that correspond to changed user data 120). The unique portions of the subsequent backup image can be written to deduplicated data store 160, while the duplicate portions will not be written (since the duplicate portions are identical to instances of portions already stored in deduplicated data store 160). Since only single instances of portions of a backup image are stored in deduplicated data store 160, metadata store 165 can provide a mapping of a backup image to the various non-duplicative portions stored in deduplicated data store 160 that compose the backup image. Thus, a single backup image can be associated with multiple portions stored throughout the deduplicated data store 160, and multiple backup images can be associated with a single portion (e.g., the multiple backup images share the single portion). For example, the subsequent backup image can be associated with unique portions of the subsequent backup image that were written to deduplicated data store 160 and with unique portions of the first backup image that were previously written to the deduplicated data store 160. Metadata store 165 can store associations between a backup image and the portions that compose the backup image as a group of references or pointers, where each reference indicates an entry of the central index that corresponds to a portion included in the backup image.

As additional backup images are added to deduplicated data store 160, backup image data can become fragmented across deduplicated data store 160 as portions of changed user data 120 are stored. Thus, a recent backup image stored in deduplicated data store 160 may include portions of recently changed user data 120 contiguously located in deduplicated data store 160, and may include multiple references to previously changed user data associated with older backup images, which are stored in various non-contiguous locations throughout deduplicated data store 160. If a user were to restore the recent backup image from deduplicated data store 160, deduplication server 140 would have to read numerous portions of data associated with older backup images from across the various locations (e.g., various containers) in deduplicated data store 160. Thus, as a backup image becomes more fragmented, restoration of the backup image can become more inefficient due to the increasing amount of time spent on performing a growing number of access operations needed to read each portion of data of the backup image from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2A:
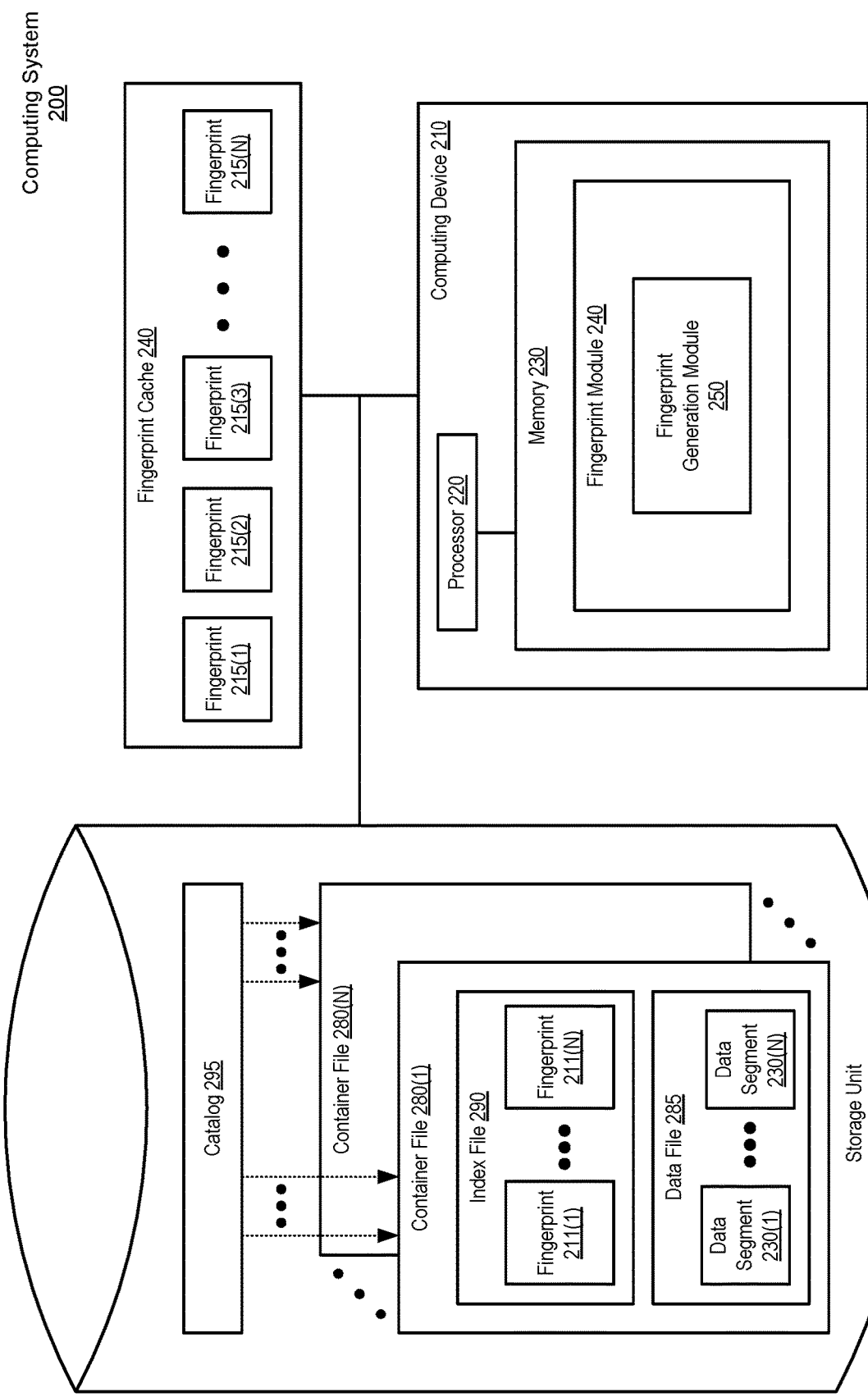
FIG. 2A is a simplified block diagram illustrating components of a computing system supporting deduplication, according to embodiments of methods and systems such as those disclosed herein.
Figure 2B:
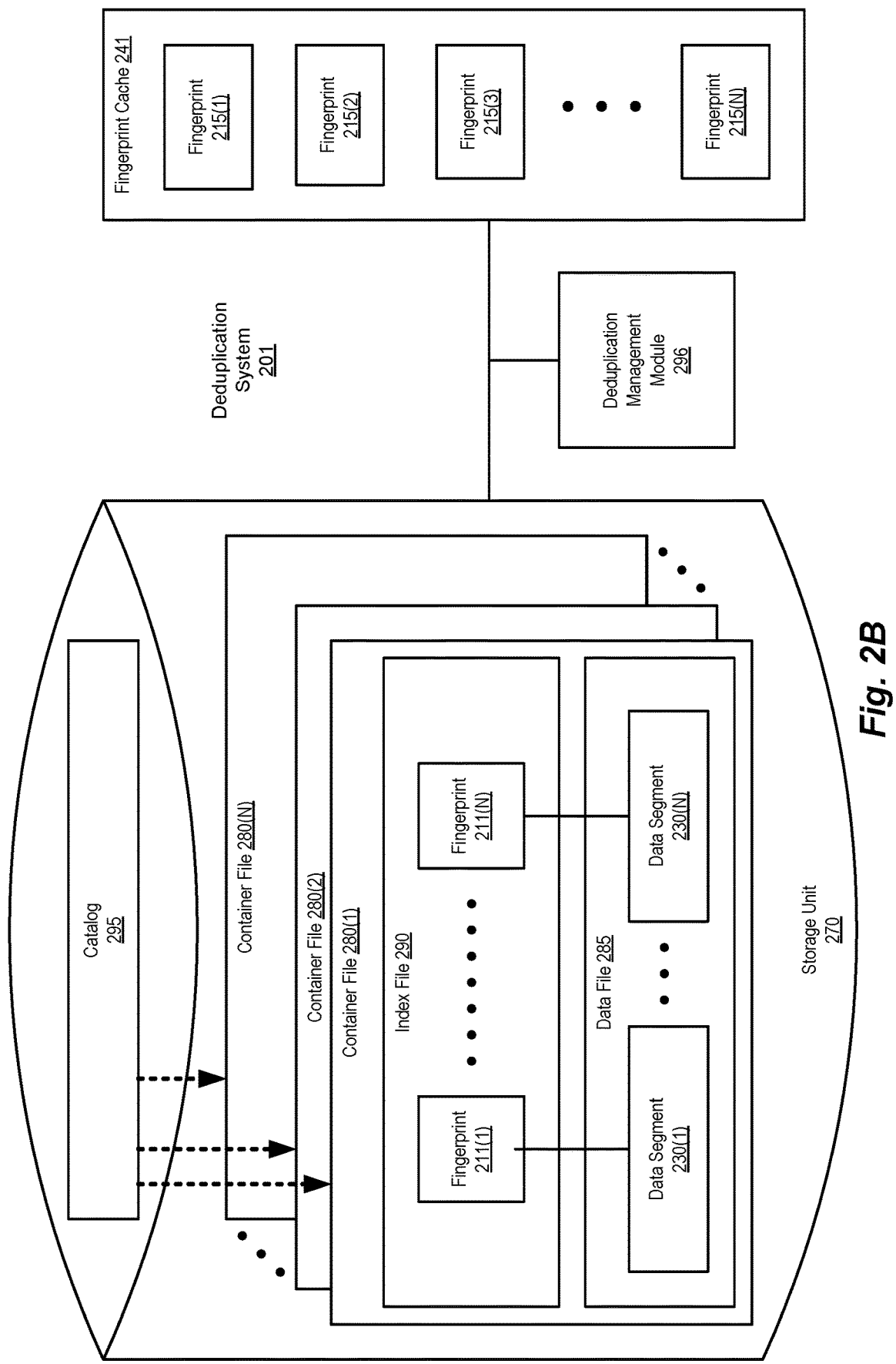
FIG. 2B is a block diagram of a computing system that stores multiple fingerprints and their associated data segments in a container file, according to embodiments of methods and systems such as those disclosed herein.

FIG. 2A is a block diagram of a computing system (which can be a client computing system or a server computing system, and which is depicted in FIG. 2A as a computing system 200; a deduplication system 201 is therefore depicted in FIG. 2B). Computing system 200 includes a computing device 210, a storage unit 270, and a fingerprint cache 240. As will be appreciated in light of the present disclosure, a fingerprint cache such as fingerprint cache 240, in certain embodiments, facilitates a determination as to whether data represented by a given fingerprint is stored in the system, as well as facilitating the identification of the container file in which the data in question (i.e., that represented by the given fingerprint) is stored. As shown, computing device 210 is communicatively coupled to storage unit 270 and fingerprint cache 240. Computing device 210 can be implemented using one or more of a variety of different types of computing devices, including a server, personal computing device, laptop computer, net book, personal digital assistant, cellular phone, or the like. It is noted that this is a simplified example, and that other embodiments can include far more complex organizational and configuration schemes than are shown here.

Computing device 210 includes a processor 220, and memory 230. Computing device 210 also includes a fingerprint module 240 which implements a fingerprint generation module 250. Fingerprint generation module 250 generates new fingerprints for a given data segment by implementing, for example, a fingerprint generation routine that generates a hash value corresponding to the given data segment. In this example, fingerprint generation module 250 implements a routine that uses a fingerprinting algorithm to generate a fingerprint (hash value).

Storage unit 270 stores a number of container files (e.g., such as one of container files 280(1)-(N), referred to herein for the sake of simplicity as container file 280, as an example of a container file and/or other such storage constructs) which includes a data file 285 and an index file 290. In this example, index file 290 stores fingerprints (e.g., fingerprints 211(1)-(N)) and data file 285 stores data segments (e.g., data segments 230(1)-(N)). Fingerprint cache 240 is a dedicated cache for storing fingerprints (depicted in FIG. 2A as fingerprints 215(1)-(N)). As will be appreciated in light of the present disclosure, the fingerprints stored in fingerprint cache 240 can represent data objects generally (e.g., data storage constructs such as files and the like).

Computing device 210 is coupled to storage unit 270. In this example, storage 270 stores container file 280, but can also store data (not shown) in addition to container file 280, and can do so using other formats. Storage 270 can be a persistent storage device and can include one or more of a variety of different storage devices, including hard disks, compact discs, digital versatile discs, solid state drives (SSDs; e.g., FLASH memory), and the like, or one or more logical storage devices such as volumes implemented on one or more such physical storage devices.

Computing device 210 is also coupled to a fingerprint cache 240. In this example, fingerprint cache 240 can be main memory, an SSD, or even a file, and implements a cache such that data (e.g., frequently accessed fingerprints) can be served to computing device 210 in an expeditious manner to determine the existence of a given fingerprint and where the data represented by that fingerprint is stored, versus, for example, from a slower storage device (e.g., a hard disk drive (HDD)). However, fingerprint cache 240 can be implemented on one or more of a variety of different storage devices, including hard disks, compact discs, digital versatile discs, and the like, or on one or more logical storage devices such as volumes implemented on one or more such physical storage devices.

Computing device 210, storage unit 270, and fingerprint cache 240 can be integrated (e.g., where the storage device is coupled to the node's internal processing devices by an internal bus and is built within the same chassis as the rest of the node) or separate. If separate, computing device 210, storage unit 270, and fingerprint cache 240 can be coupled by a local connection or via one or more networks (e.g., local area networks (LANs) and/or wide area networks (WANs) (not shown)).

FIG. 2B is a block diagram of a computing system that stores multiple fingerprints and their associated data segments in a container file. In such a deduplication backup system (depicted in FIG. 2B as deduplication system 201), data storage constructs such as data segments (e.g., data segments 230(1)-(N)) are depicted as being stored in a data file (e.g., such as data file 285) of container file 280(1). Each container file includes an index file (e.g., such as index file 290) and a data file (e.g., such as data file 285). In this example, index file 290 stores fingerprints 211(1)-(N) and data file 285 stores data segments 230(1)-(N). In the embodiment depicted in FIG. 2B, each of fingerprints 211(1)-(N) corresponds to a corresponding one of data segments 230(1)-(N). Also as shown in FIG. 2B, fingerprint cache 241 stores fingerprints 215(1)-(N). For example, after data segments and their associated fingerprints are stored in a container file 280, fingerprint cache 241 can be maintained to indicate that the data segment in question is stored in a container file 280 (and so is a duplicate).

As before, fingerprints 215(1)-(N) represents data storage constructs generally (e.g., the aforementioned data segments, and/or files or the like). In a deduplication backup systems that implement fingerprints, an index file can be employed to separately record fingerprint information, data segment location, and data segment size for each unique fingerprint associated with a data segment (e.g., <fp1, size1, offset1>, <fp2, size2, offset2>, and so on, as described, for example, in connection with FIG. 3B, subsequently). Also, the index file may include other information about the data segments, including (but not limited to) information indicating whether the data segment is compressed, encrypted, and/or has other such characteristics that may need to be taken into account when accessing that data segment.

Deduplication system 201 can include, for example, a deduplication management module 296 to manage various of the aforementioned information. For example, deduplication management module 296 can manage insertion of fingerprints in index file 290, data segments in data file 285, storage of fingerprints in fingerprint cache 241, and references and other information in catalog 295. Further in this regard, deduplication management module 296 can perform or cause to be performed deduplication management operations such as those described elsewhere herein.

FIG. 3A is a simplified block diagram illustrating an example of the composition of container file 280, which, according to one or more embodiments, allows a backup operation to reference multiple fingerprints representing the data segments that make up a given data construct, such as a file. At the beginning of an initial backup operation, new data segments are written into the given container files (e.g., a container such as container file 280). At the end of the initial backup operation, a data object is stored in the newly-created container file. The data object can contain, for example, the following information: <fp1, size1, containerID1>, <fp2, size2, containerID2>, and so on. A data object typically corresponds to a backup image that includes the data segments to be backed up during a full or incremental backup operation. As will be also appreciated in light of the present disclosure, a data object may be represented by a fingerprint that is the hash value of the data object content.

According to one embodiment, at the beginning of a backup operation from the same client and/or backup policy that performed and/or requested the initial backup operation, data objects that include fingerprints of the last full backup operation (in this example, the initial backup operation) can be retrieved from container file 280. Data segments (or other data storage constructs, as noted) in the new backup operation are fingerprinted (e.g., using fingerprint generation module 250) and looked up within fingerprints from the last full backup operation (e.g., fingerprints 215(1)-(N) in fingerprint cache 240).

If a given fingerprint is not among fingerprints 215(1)-(N) in fingerprint cache 240, a "cache miss" has occurred, and such as indicated (thereby indicating that one or more fingerprints thus generated were not present in the last full backup operation). That being the case, such fingerprints are looked up in a fingerprint index cache, which, in certain embodiments, is a centralized fingerprint index cache such as that depicted in connection with FIG. 2B. In certain embodiments, if the fingerprints are not found in such a central fingerprint index cache, the fingerprints are inserted into the central fingerprint index cache. Future backup operations can then reference fingerprints from both the last full backup operation (e.g., an initial backup operation) and the new backup operation.

In some embodiments, such a central fingerprint index cache is maintained by a deduplication server. In such a scenario, the central fingerprint index cache includes at least part of the entire set of fingerprints that exist in the deduplication system and includes fingerprints generated by a fingerprinting algorithm such as that described previously herein. Although future backup operations can reference fingerprints from the previous backup operations, the central fingerprint index cache will typically not maintain copies of all the fingerprints making up fingerprints 215(1)-(N) because, in this example, fingerprint cache 240 is implemented on an SSD. While such an implementation provides faster fingerprint retrieval and lookup functions, such a storage technology does not typically provide enough storage to store all the fingerprints associated with the various data segments in the previous backups. Therefore, index file 290 is needed, to ensure that future backup operations can reference index file 290 (rather than having to store all such fingerprints in fingerprint cache 240).

FIG. 3B is a simplified block diagram illustrating an example of the composition of index file 290 and data file 285, according to one or more embodiments. That being the case, index file 290 can be seen to include a number of metadata entries (depicted in FIG. 3B as metadata entries 297(1)-(N), and referred to in the aggregate as metadata entries 297), which, in turn, include: <FP1, size1, offset1>, <FP2, size2, offset2>, and so on, where FP1 represents fingerprint 211(1), FP2 represents fingerprint 211(2), and so on. Metadata entries 297 are shown in an example as a segment metadata entry 298, which includes a fingerprint, a data segment size, and a data segment offset within data file 285. While metadata entries 297 are depicted as including such information, additional information (e.g., compression/encryption flags, a checksum, other data references, and/or other relevant information pertinent to the data stored in data file 285). Index file 290 also includes a header 299, which can be used to maintain information regarding the aforementioned metadata entries. As is shown in FIG. 3B, the size and offset information, associated with each of the fingerprints, serves as an index to a data segment in data file 285 to which the given fingerprint corresponds.

In some embodiments, index file 290 includes a number of data object records, each of which may include, in addition to the foregoing, a unique identifier (UID) list, which may list one or more UIDs of file records in catalog 295, as described subsequently in connection with FIG. 4. When a file's data is to be inserted in the catalog (e.g., as part of a backup operation), a file record is created with a UID for the file and fingerprint for the data of the file. In such embodiments, the given UID can be inserted into the data object record that has the data fingerprint in question (i.e., the fingerprint of the data object storing some or all of the file data of the inserted file). When a file record is removed (e.g., in response to a request from a source computer), the UID of that file record is also removed from the corresponding data object record. Thus, in such embodiments, the UID list of a data object record uniquely identifies each file to which file data corresponds.

Figure 3C:
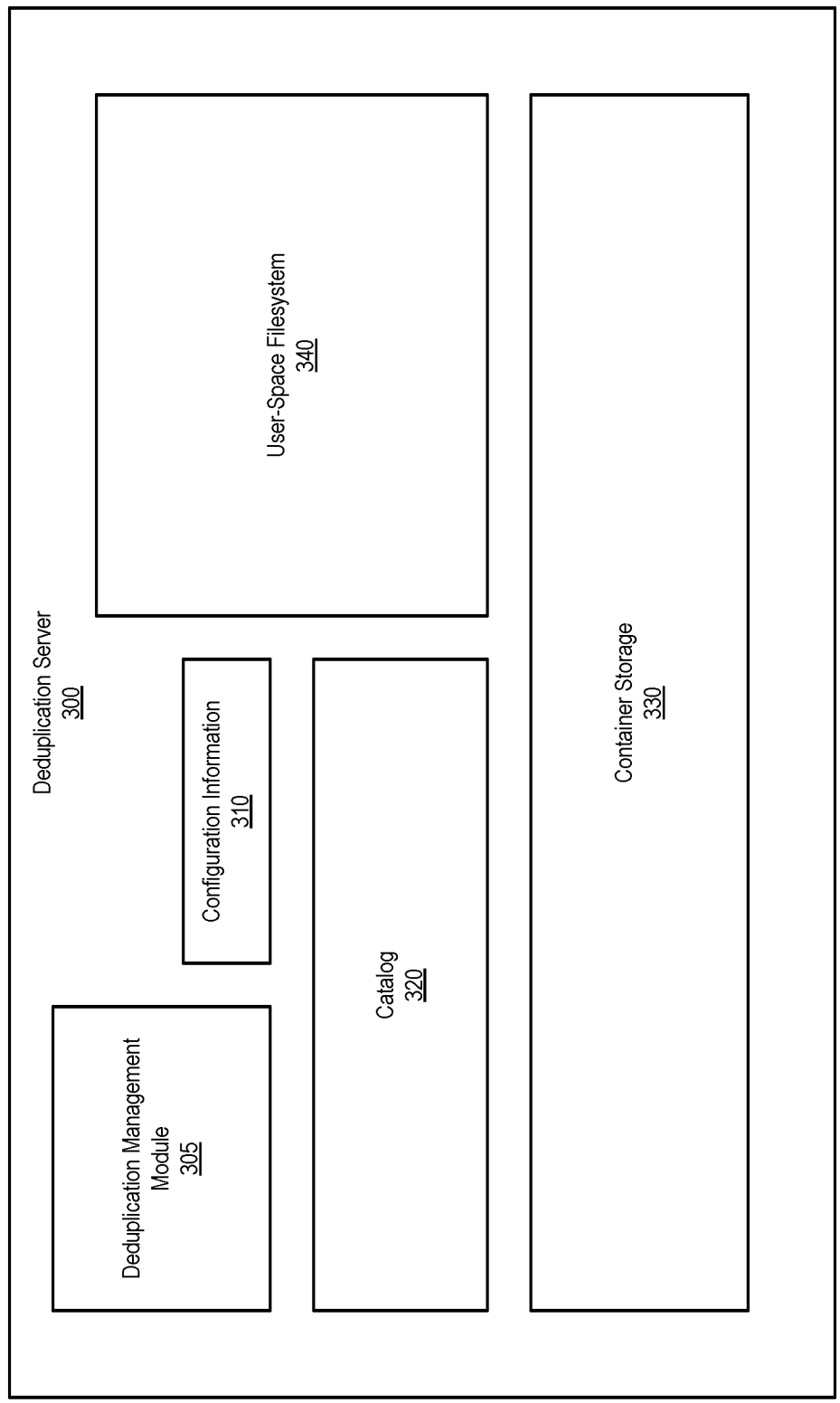
FIG. 3C is a simplified block diagram illustrating an example of a deduplication system, according to embodiments of methods and systems such as those disclosed herein.

FIG. 3C is a simplified block diagram illustrating an example of a deduplication system that provides a user-accessible storage area, according to methods and systems such as those described herein. That being the case, FIG. 3C depicts one embodiment of a deduplication server 300, in the manner of deduplication server 140 of FIG. 1. Deduplication server 300 includes a deduplication management module 305 (e.g., in the manner of deduplication management module 296, described earlier in connection with FIG. 2B), which manages and maintains a variety of information, including, in the depicted embodiment, configuration information 310, catalog information 320 (in the manner of catalog 295 described previously), and container storage 330 (in the manner of containers 280 described previously). In the embodiment depicted in FIG. 3C, deduplication server 300 also supports a user-space file system 340. Despite existing in the storage of deduplication server 300, user-space file system 340 can be accessed from other computing systems (e.g., client systems 110), by users of such other computing systems, in the manner of file systems local to those computing systems. Such can be accomplished using, for example, protocols such as NETWORK FILE SYSTEM (NFS), SERVER MESSAGE BLOCK (SMB), COMMON INTERNET FILE SYSTEM (CIFS), or the like. Particular features of a file system that can be advantageous to embodiments such as those described herein are discussed subsequently.

In such filesystems, a directory in user-space file system 340 can be mounted in a file system of one or more of client systems 110, and so allow users of those client systems two access information in user-space file system 340, which allows files being written into the file system to be deduplicated. However, as noted elsewhere herein, users often take advantage of such shared access in ways that present the challenges described earlier herein, including changes to content, naming, location, and the like. That being the case, the structure of deduplication server 300 is presented as another example of a configuration that can suffer from such issues, and so experience inefficiencies caused by significant numbers of references and alteration to the data storage constructs represented thereby.

Figure 4:
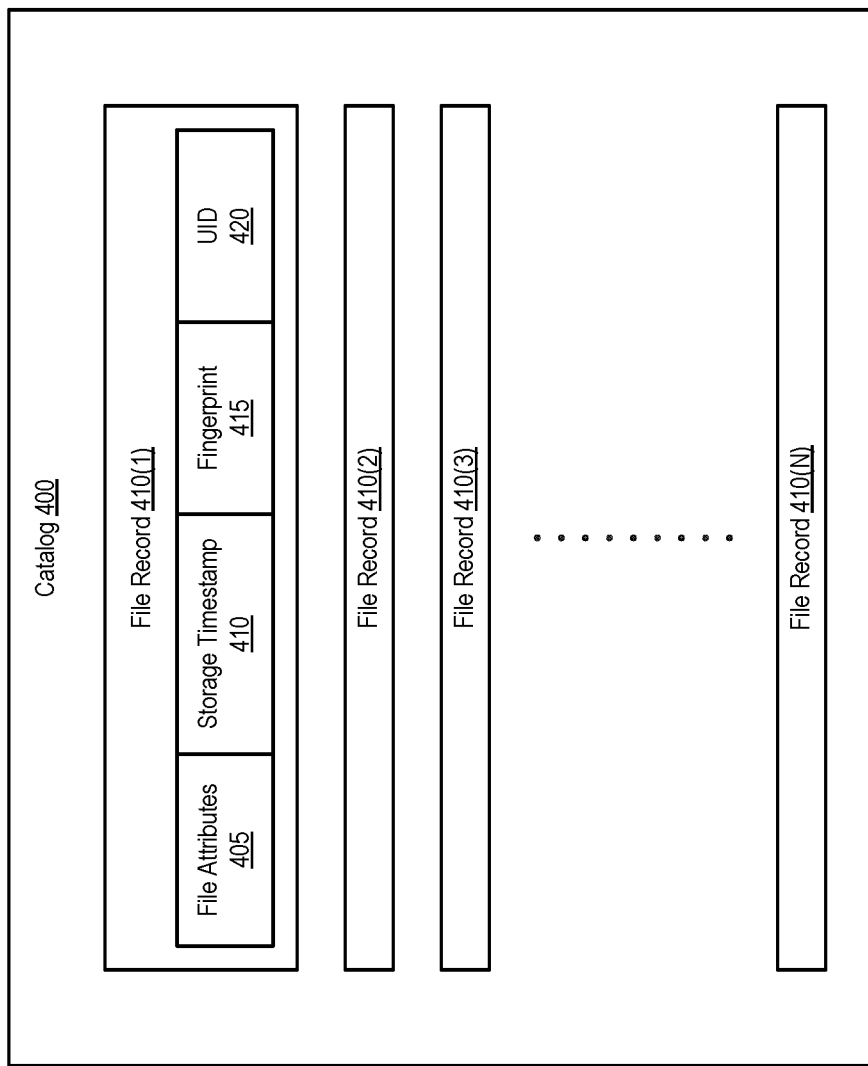
FIG. 4 is a simplified block diagram illustrating an example of a file record, according to embodiments of methods and systems such as those disclosed herein.

FIG. 4 is a simplified block diagram illustrating an example of a catalog, according to embodiments of methods and systems such as those disclosed herein. According to the illustrated embodiment, one or more file records can be stored in a catalog such as catalog 295 (a comparable construct being illustrated in FIG. 4 as a catalog 400), and is illustrated in FIG. 4 as being among a number of such file records (depicted in FIG. 4 as file records 410(1)-(N), or in their entirety, as file records 410). Using file record 410(1)

as an example, it can be seen that FIG. 4 depicts file record 410(1) as including one or more file attributes 405, a storage timestamp 410, a fingerprint 415, and a unique identifier (UID) 420. In various embodiments, a file record may include fewer and/or additional details and/or various other pieces of information.

In certain embodiments, file attributes 405 includes a number of attributes of the corresponding file (e.g., filename, path, size, owner, modification/access history, permissions, and so on, as relates to the file in question). Storage timestamp 410 may include an indication of when the file record was created or last updated, for example. In certain embodiments, data fingerprint 415 includes fingerprint information that effectively uniquely identifies the data in the corresponding file, such that two files with the same data portion will have the same data fingerprint and two files with different data portions will have different fingerprints. For example, the data fingerprint may be derived by applying one or more hash functions to the data portion of the corresponding file, as noted earlier. Various other methods for calculating data fingerprints can be used to calculate data fingerprints, as also noted earlier. According to the illustrated embodiment, file record 410(1) also includes unique identifier (UID) 420 for the corresponding file. UID 420 may uniquely identify the file corresponding to file record 410(1) using various techniques, including those described in connection with the generation of fingerprints such as those associated with the data segments described elsewhere herein. In certain embodiments, catalog 400 includes a path object (PO, as noted) corresponding to each data object group in the catalog.

Figure 5:
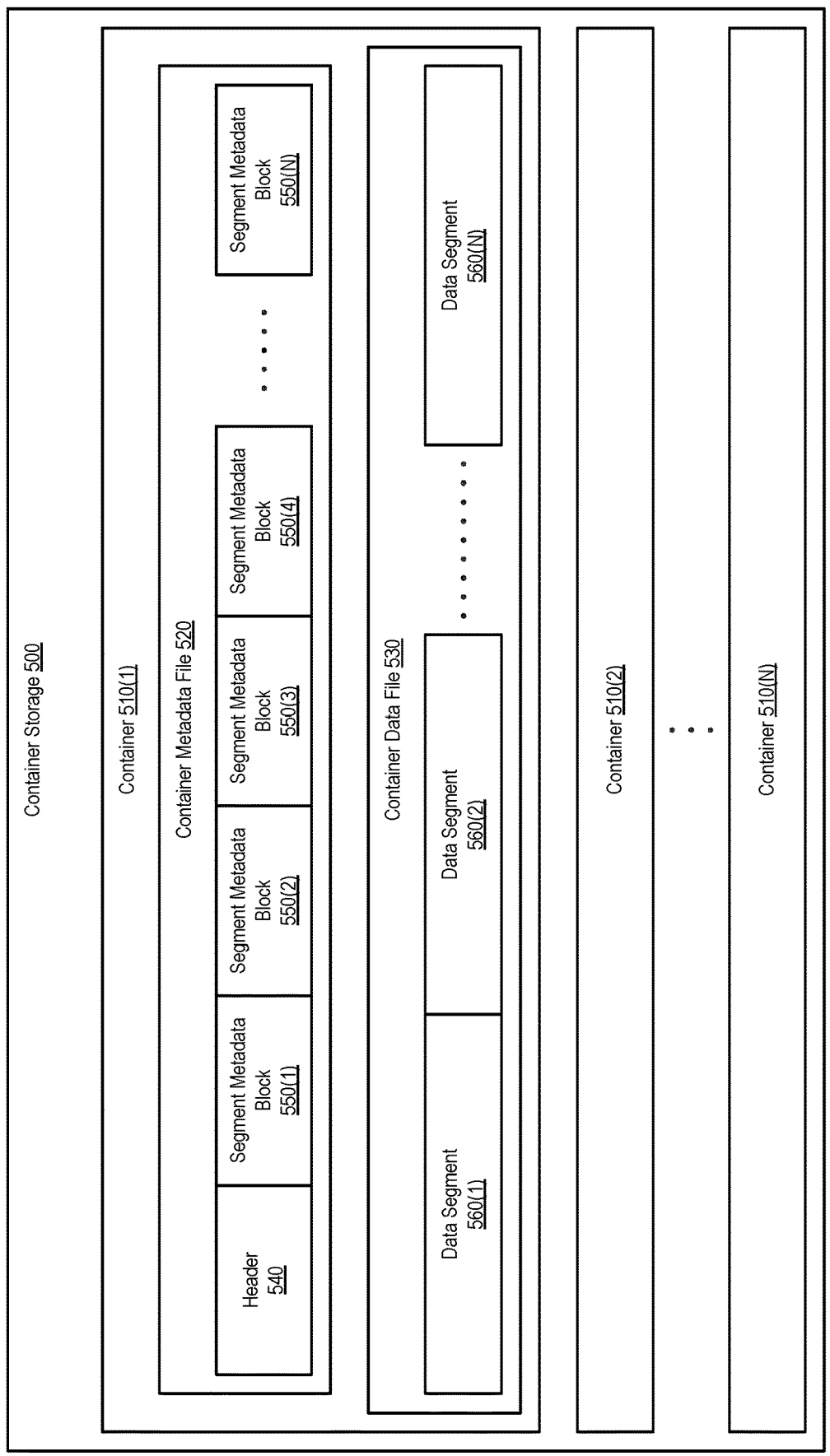
FIG. 5 is a simplified block diagram illustrating an example of container storage and containers therein, according to methods and systems such as those described herein.

FIG. 5 is a simplified block diagram illustrating an example of container storage, according to methods and systems such as those described herein. FIG. 5 thus depicts an example of container storage 330 as container storage 500 and, in so doing, provides greater detail as to the information stored therein. Container storage 500 provides for the storage of a number of containers (depicted in FIG. 5 as containers 510(1)-(N), and referred to in the aggregate as containers 510). While container storage 500 is depicted in FIG. 5 in a conceptual manner, in one embodiment, each of containers 510 can be implemented as one or more files in a file system such as those noted previously herein. Further detail is provided in connection with container 510(1). Container 510(1) is depicted as including a container metadata file 520 and a container data file 530. Container metadata file 520, in turn, includes a header 540 and some number of segment metadata blocks (depicted in FIG. 5 as segment metadata blocks 550(1)-(N), and referred to in the aggregate as segment metadata blocks 550). As will be appreciated in light of the present disclosure, segment metadata blocks 550 are comparable in content and structure to metadata entries 297(1)-(N), and are intended to be interchangeable therewith. Container data file 530 includes a number of data segments (depicted in FIG. 5 as data segments 560(1)-(N), and referred to in the aggregate as data segments 560).

Example Techniques for Deduplicated Backup Storage in Hyper-Converged Environments As noted previously, data deduplication (or more simply, deduplication) is a process that eliminates redundant copies of data and reduces storage and transfer overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device, and can also provide facilities for determining if such data transfer is needed by checking fingerprints against fingerprints maintained by, for example, a backup server and/or a deduplication server. Performing deduplication at the source can reduce bandwidth and storage use.

As is also noted, deduplication involves linking references to data content. Although each data segment may be referenced by more than one backup image, storage reclamation can remove data segments in appropriate situations, such as if one or more backups associated with the data segments thus referenced have expired. For example, free space in the given data containers can be compacted to reclaim storage space recently made available, for example, as a result of the deletion of one or more backups resulting from the given backups having expired. Unfortunately, as noted, large numbers of data objects (e.g., files) can lead to large numbers of references, and so, performance issues such as those described elsewhere herein can also result from such compaction.

Further, in light of the aforementioned issues that can be experienced in erasure-coded storage systems, methods and systems such as those described herein provide improved write performance by, in general terms, distinguishing between data and metadata (e.g., when storing deduplicated data, for example, as from a backup). In so distinguishing, methods and systems such as those described herein provide such improved write performance while maintaining the integrity of such data. As will be appreciated in light of the present disclosure, such an approach improves write performance by journaling only a container's metadata, while maintaining data integrity by preventing the data from different backups being stored (in the container) in the same EC stripe. Further details in this regard, as well as advantages thereof, are now described.

Figure 6A:
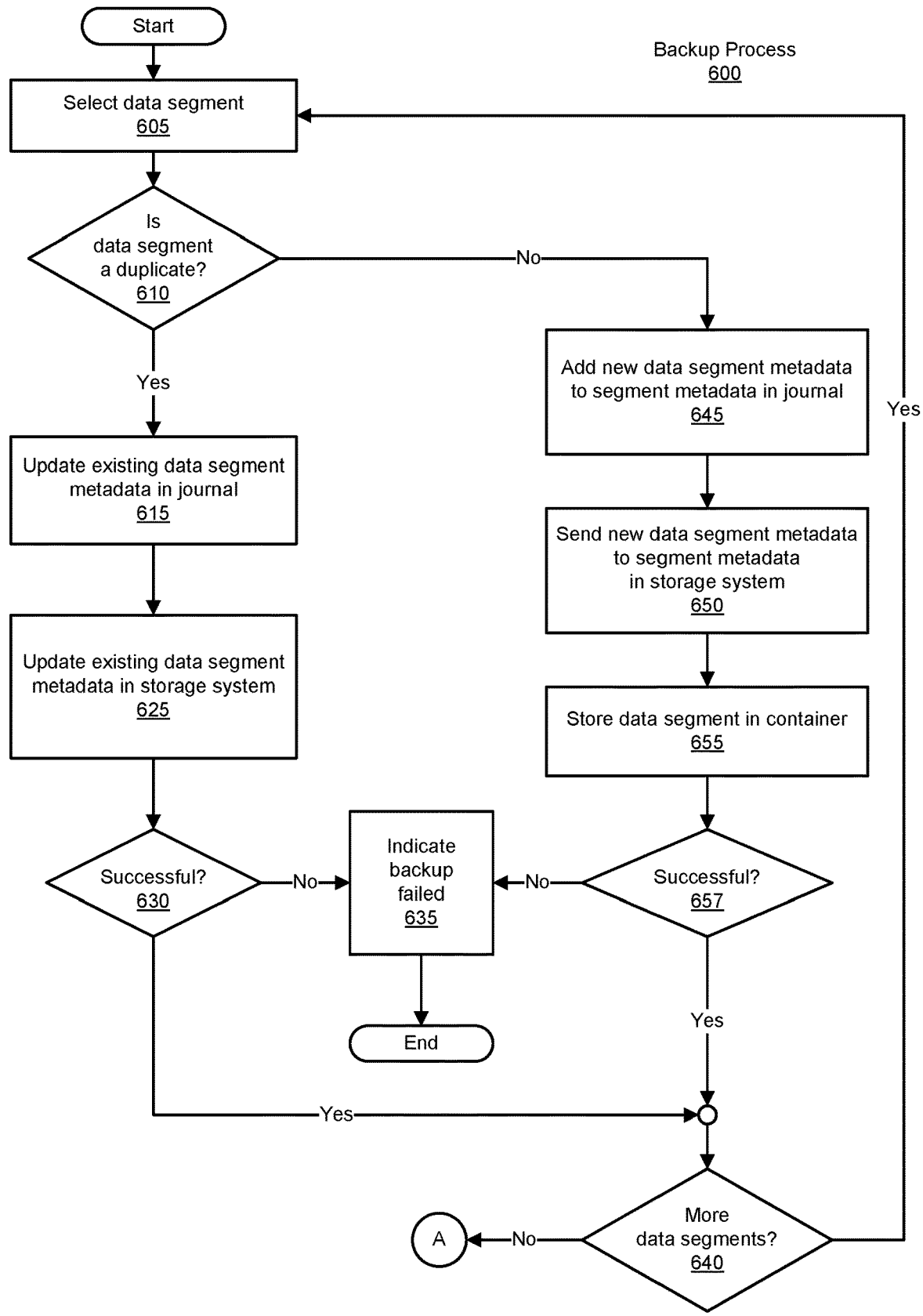
FIGS. 6A and 6B depict a flow diagram illustrating an example of a process for performing a deduplicated backup operation, according to embodiments of methods and systems such as those disclosed herein.
Figure 6B:
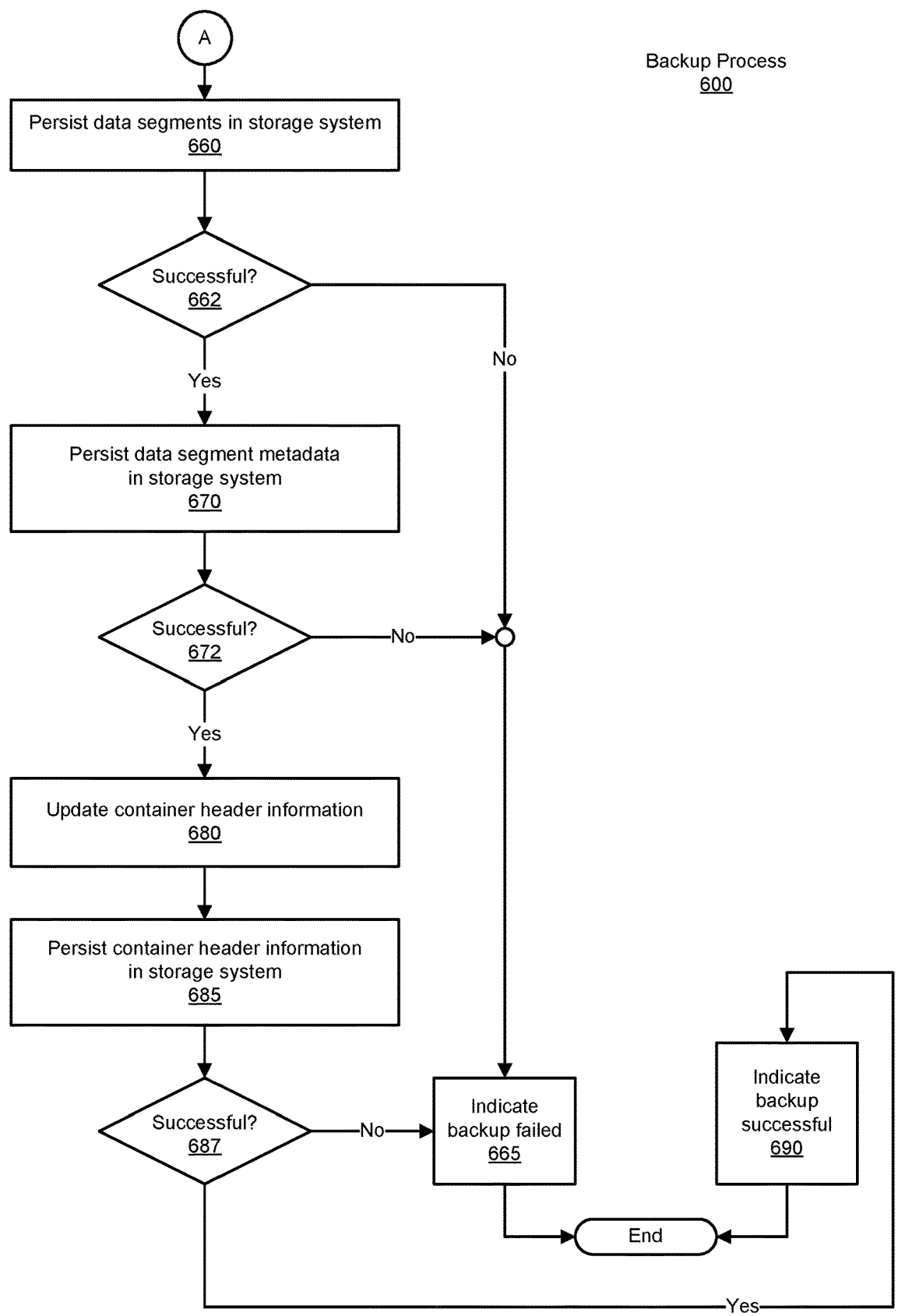

FIGS. 6A and 6B depict a flow diagram illustrating an example of a process for performing a deduplicated backup operation, according to embodiments of methods and systems such as those disclosed herein. That being the case, a deduplicated backup process 600 (or more simply backup process 600) is depicted. Backup process 600 begins with the receipt of an indication that a deduplicated backup is to be performed (not shown). If no such event has occurred, backup process 600 iterates, awaiting the occurrence of such an event. In response to a determination that a backup operation is to be performed, the data that is the subject of the backup operation is divided into a number of data segments. Each of these data segments can be represented by a fingerprint, as noted. To allow the present discussion to focus on the salient features of the embodiments described herein, backup process 600 depicts a simpler deduplication process then might otherwise be implemented. For example, caching of fingerprints at a client or server can be implemented, as can a number of techniques directed to improving backup operation performance.

With that in mind, backup process 600 begins with the selection of one of the data segments to be backed up (605). A determination is then made as to whether the data segment in question is a duplicate (610). If the data segment in question is a duplicate (and so, a duplicate data segment has already been stored), the corresponding data segment metadata stored in the journal is updated (615). Next, existing data segment metadata stored in the storage system is updated (625). A determination is made as to whether these operations were successful (630).

If the operations associated with updating the data segment's metadata were unsuccessful (e.g., some manner of failure was encountered), an indication to the effect that the attempted backup has failed is made (635). Backup process 600 then concludes. It will be appreciated that, as discussed subsequently, the indication of a failed backup may be used to prompt another attempt to backup the data in question.

If the operations associated with updating the data segment's metadata were successful, however, backup process 600 proceeds to a determination as to whether more data segments remain for deduplication (640). If further data segments remain for deduplication, backup process 600 loops to the selection of the next data segment (605) and backup process 600 continues. Alternatively, if the data in question has been deduplicated (640), backup process 600 proceeds to the remainder of that process by way of connector "A" to the process depicted in FIG. 6B.

Returning to the determination as to whether the data segment in question is a duplicate (610), if that determination indicates that the data segment in question is not a duplicate, backup process 600 proceeds with adding new data segment metadata (i.e., a new segment metadata block) to the copy of the container metadata stored in the journal (645). This new data segment metadata is also sent to the storage system for storage as a new segment metadata block in the container metadata (650).

As before, a determination is made as to whether the foregoing storage operations were successful (657). In the case in which these operations encountered a failure, an indication to that effect is made (635) and backup process 600 concludes. Alternatively, if the storage operations were successful, backup process 600 proceeds with making a determination as to whether further data segments remain to be deduplicated (640). As before, if further data segments remain, backup process 600 loops to the selection of the next data segment (605) and backup process 600 proceeds with the processing of that data segment. In the alternative, if no further data segments remain, backup process 600 proceeds to the remainder of that process by way of connector "A" to the process depicted in FIG. 6B.

FIG. 6B depicts the remainder of backup process 600. Beginning with connector "A", backup process 600 proceeds with persisting the (deduplicated) data segments in the storage system (660). As before, a determination is made as to whether this operation was successful (662). If the operation was unsuccessful, an indication that the backup operation has failed is provided (665). As before, in such a situation, backup process 600 then concludes. It will be appreciated in light of the present disclosure that the failure of such a backup operation is tolerable with regard to data integrity because such a failure will be evident to the application software requesting the backup. In this regard, such an operation is transactional in nature, and so will not result in such application software's proceeding on the (erroneous) basis that such a transactional operation was successful, when such is not the case (or otherwise becomes so). IT will be further appreciated that the persisting of the data segments begins on an EC stripe boundary, as is discussed elsewhere herein. It will also be appreciated that, while such boundary may be on an extent boundary, such need not be the case (e.g., in the situation in which an extent covers multiple EC stripe units). Further still, as is noted elsewhere herein, in the persisting of multiple data segments in a data span, while the data span (e.g., the first data segment of the data span) will begin on an EC stripe boundary, the remaining constituent data segments need not be so aligned.

If the backup's data segments were successfully persisted to the storage system, backup process 600 proceeds with the persisting of data segment metadata (segment metadata blocks) in the storage system parentheses 670). Once again, a determination is made as to whether the operation in question was perform successfully (672). Also as before, if the operation was not perform successfully, an indication to this effect is provided (665) and backup process 600 concludes.

In the alternative, if the data segment metadata in question was successfully persisted to the storage system, container header information is updated (680) and is persisted to the storage system (685). Again, a determination is made as to whether the operations related to the given container header information were successful (687). If these operations were unsuccessful, an indication to this effect is provided (665) and backup process 600 concludes. Alternatively, if the operations related to saving the container header information were successful, an indication that the backup operations of backup process 600 were successful is provided (690) and backup process 600 concludes. In certain embodiments (and in fact, generally), an indication that a backup operation was unsuccessful (i.e., failed) will result in the backup operation being reattempted, though that need not strictly be the case. However, it will be appreciated that, in employing an approach such as that depicted as backup process 600, data integrity can be maintained when such a process is implemented using traditional storage systems (e.g., RAID arrays and the like).

Figure 7:
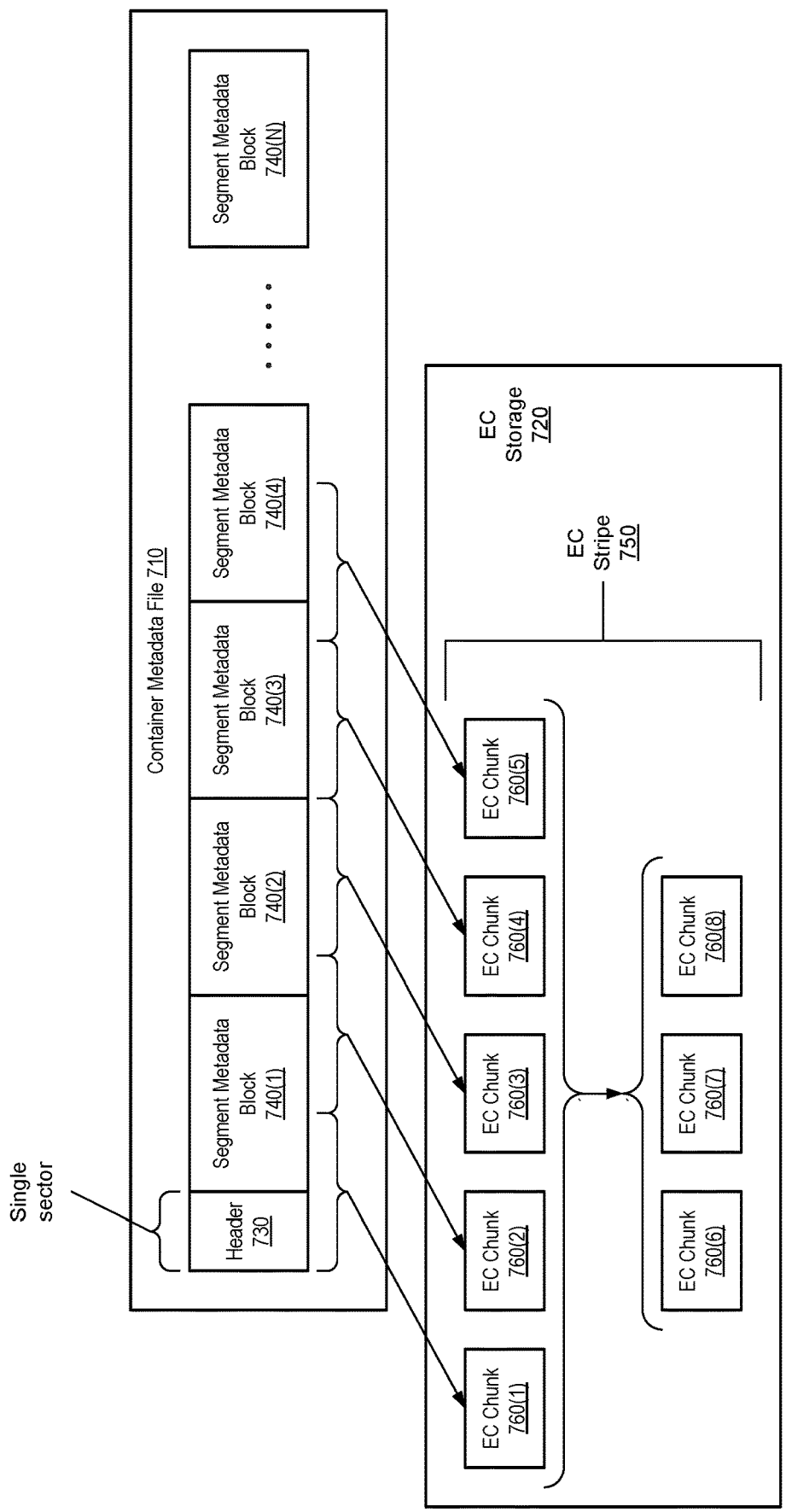
FIG. 7 is a simplified block diagram illustrating an example of a container metadata file and its storage in erasure-coded storage, according to embodiments of methods and systems such as those disclosed herein.

Example Techniques for Maintaining Data Integrity of Deduplicated Backups Using Erasure-Coded Storage FIG. 7 is a simplified block diagram illustrating an example of a container metadata file and its storage in erasure-coded (EC) storage, according to embodiments of methods and systems such as those disclosed herein. That being the case, FIG. 7 depicts a container metadata file 710 and its storage in erasure-coded storage 720. Container metadata file 710 includes a header 730, as well as a number of segment metadata blocks (depicted in FIG. 7 as segment metadata blocks 740(1)-(N), and referred to in the aggregate as segment metadata blocks 740). As depicted in FIG. 7, the various portions of container metadata file 710 are stored in EC storage (ECS) 720 as a number of EC stripes (an example of which is depicted in FIG. 7 as EC stripe 750). As is also depicted, header 730, segment metadata blocks 740(1)-(3), and a first portion of segment metadata blocks 740(4) are stored in EC stripe 750 as a number of EC chunks, those being EC chunks 760(1)-(8) (using, in this example, a 5/8 erasure code). It will be appreciated that such storage is intended only as an example, and no particular relationship between the amounts of storage consumed by any of these elements is necessarily intended to be conveyed (e.g., it is not uncommon, in terms of the amount of storage space consumed by such elements, for a header's storage space requirements to be significantly less than that of a segment metadata block, or the ratio storage space consumed as between a segment metadata block and its associated data segment to be at a ratio of 1:100, 1:250, 1:500, or higher, for example). This being the case, as is represented in FIG. 7, EC chunks 760(1)-(5) are original data and are taken as inputs by the erasure coding process to produce EC chunks 760(6)-(8). As will be appreciated in light of the present disclosure, the storage of each of EC chunks 760 (1)-(8) on separate storage devices/systems results in the ability of EC stripe 750 to tolerate a failure in up to three of the storage devices and still be able to recover the original data. Also noted in FIG. 7 is the fact that, in this embodiment, header 730 is stored in a single sector of the storage system, which, for purposes discussed subsequently, implies an atomic operation in its storage.

Figure 8:
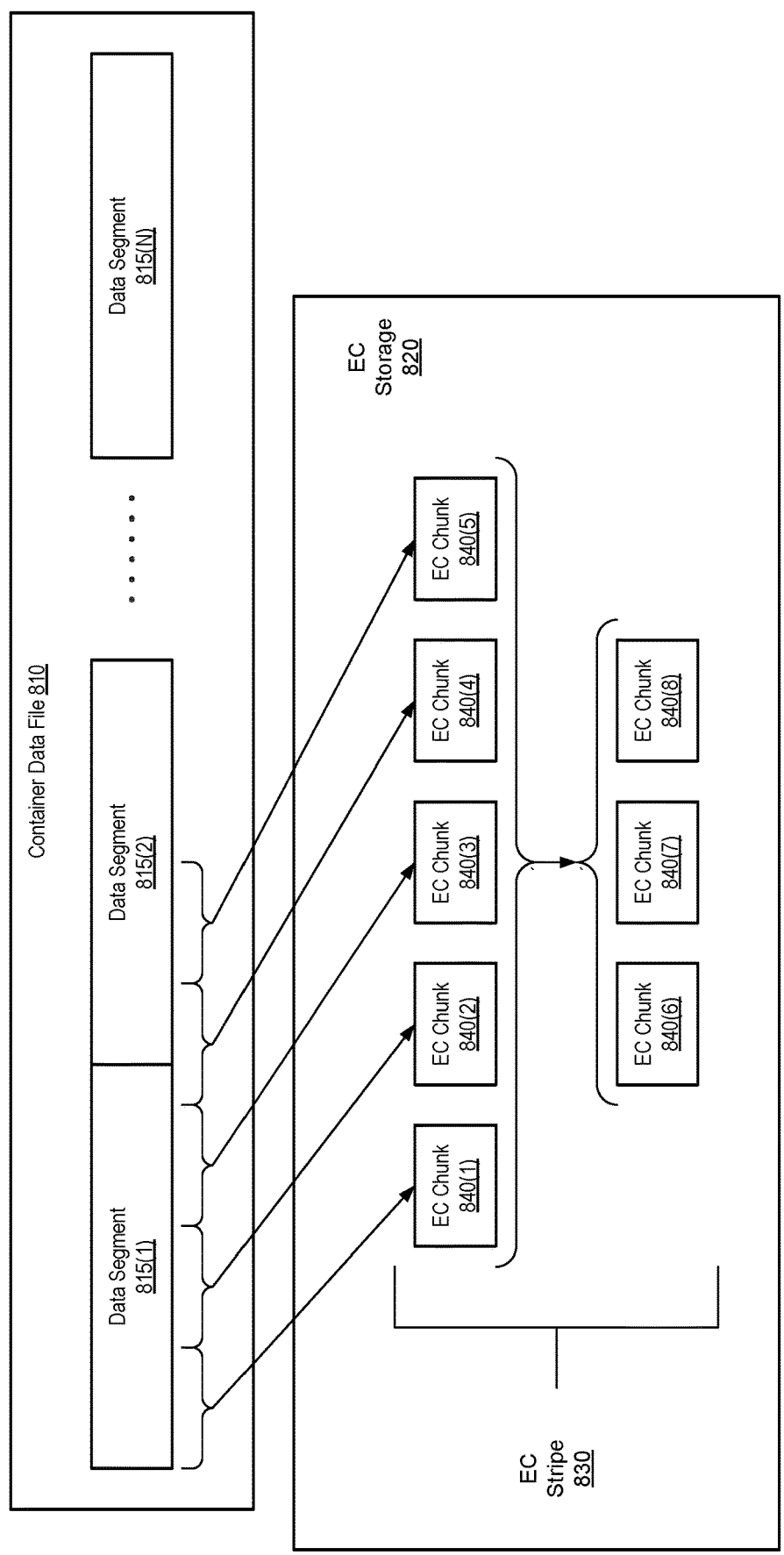
FIG. 8 is a simplified block diagram illustrating an example of a container data file and its storage in erasure-coded storage, according to embodiments of methods and systems such as those disclosed herein.

FIG. 8 is a simplified block diagram illustrating an example of a container data file and its storage in erasure-coded (EC) storage, according to embodiments of methods and systems such as those disclosed herein. In a fashion comparable to the erasure-coded storage depicted in FIG. 7, FIG. 8 depicts a container data file 810, which includes a number of data segments (depicted in FIG. 8 as data segments 815(1)-(N), and referred to in the aggregate as data segments 815). Also depicted in FIG. 8 is EC storage (ECS) 820, in which data segments 815 are stored. For example, data segment 815(2) is depicted as being stored in an EC stripe 830. EC stripe 830 is made up of a number of EC chunks, which are depicted in FIG. 8 as EC chunks 840(1)-(8) (and which are referred to in the aggregate as EC chunks 840). As noted with regard to container metadata file 710, it will be appreciated that such storage is intended only as an example, and no particular relationship between the amounts of storage consumed by any of these elements is necessarily intended to be conveyed (e.g., while the data of data segment 815(1) and a portion of data segment 815(2) are shown as mapping to EC chunks 840(1)-(5), such need not be the case—such EC chunks and data segments can be in any ratio to one another, for example). Thus, data segments 815 could map to any number of EC stripes, depending on the configuration of container data file 810 and EC storage 820.

As will be appreciated in light of present disclosure, given that the information in container metadata file 710 is journaled, the fact that writing in container metadata file 710 can be forced to start at an EC stripe boundary is sufficient to ensure that its storage can be performed transactionally. In other words, with any updates and appended segment metadata blocks being journaled, the writing of segment metadata blocks can be treated as a transaction, and so experience success or failure (and if failure, be retried). Further, given that the storage of a header can also be performed transactionally (based on its size guaranteeing the operation's atomicity), concern as to data corruption from, for example, node or network failure can be assuaged. Further in this regard, the creation of container data file 810 presents no issues, given that container data file 810 (and so, data segments 815) can be forced to begin on an EC stripe boundary. In the manner noted above, such a storage operation can be treated as transactional in nature, to the same effect. However, there remains the possibility of subsequent append operations (e.g., the appending of data segments to the container data file) resulting in an EC stripe being shared between data segments of different backup operations, with the accompanying risk to the data segments of those backups. Such issues and techniques to address them are explained in further detail below.

Figure 9:
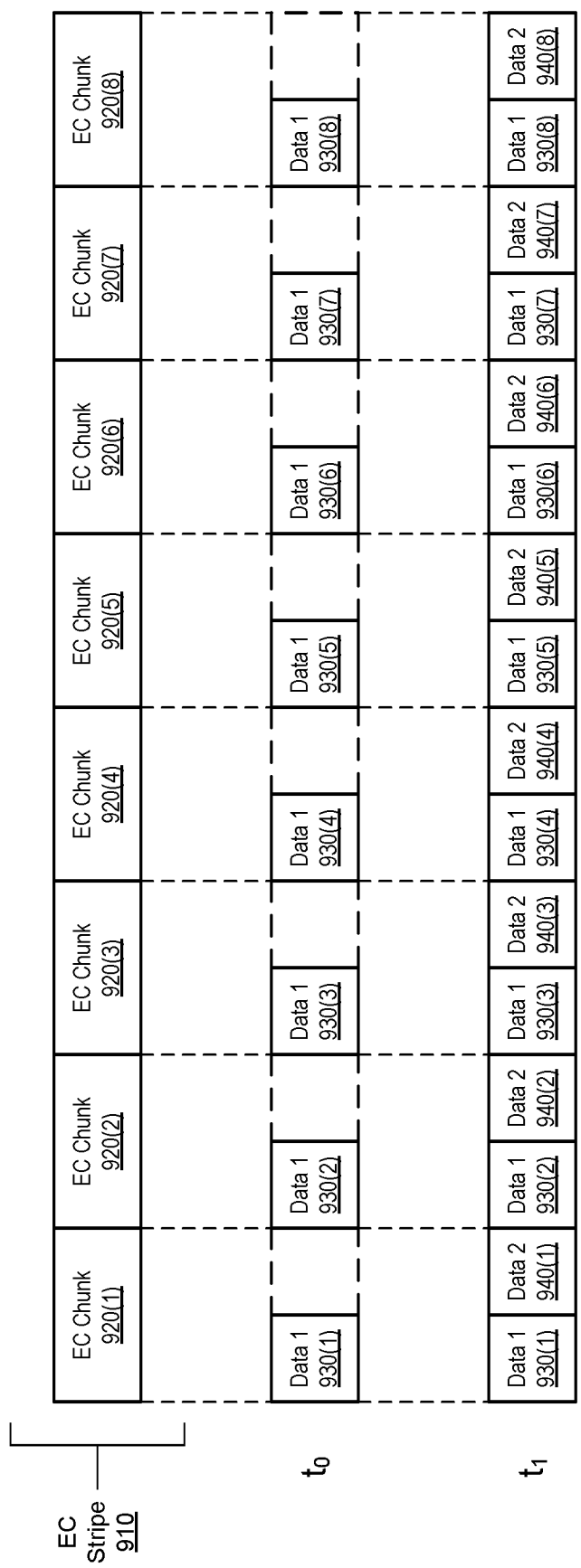
FIG. 9 is a simplified block diagram illustrating an example of erasure-coded storage, according to embodiments of methods and systems such as those disclosed herein.

FIG. 9 is a simplified block diagram illustrating an example of the potential storage of backup data in erasure-coded (EC) storage, according to embodiments of methods and systems such as those disclosed herein. Various of the aspects depicted in FIG. 9, as well as certain of the subsequent figures, are used to illustrate certain of the issues that can be encountered when supporting storage operations in an HCI environment that employs EC storage. FIG. 9 thus depicts the state of data stored in an EC stripe 910 at different points in time. EC stripe 910 includes a number of EC chunks, which appear as EC chunks 920(1)-(8) (in the manner of FIGS. 7 and 8, previously, and referred to in the aggregate as EC chunks 920). The state of data stored in EC chunks 920 at a first time (t0) includes data represented by Data 1 930(1)-(8). For purposes of this discussion, Data 1 and Data 2 represent data from different backups. As can be seen, the data of Data 1 does not completely fill EC stripe 910. As a result, at a second time ($t_1$), dated 2 (represented in FIG. 9 as Data 2 940(1)-(8)) is stored in the remainder of EC stripe 910. For purposes of applications such as those described herein, it will be appreciated in light of the present disclosure that a failure in writing Data 2 can cause issues with data integrity to the data of Data 1. For example, if the writing of Data 2 (e.g., the second backup) encounters some sort of failure, EC stripe 910, as a whole, is affected. However, the writing of Data 1 (e.g., the first backup), having been successfully persisted, is assumed to be immutable (or at least recoverable in the event of a failure). However, due to the failure in the writing of Data 2, the EC chunks of EC stripe 910 have become corrupted, and the data of Data 1 lost. Alternatively, it can be the case that the writing of both Data 1 and Data 2 were successful. However, due to a subsequent operation removing Data 1 can represent a risk of corruption to Data 2. For example, the removal of Data 1 could trigger an EC stripe partial update and, in the event of a failure, result in the loss or corruption of Data 2. As will be appreciated, neither situation is desirable, as either can result in the corruption of EC stripe 910, and do so without indication to the application responsible for such data (e.g., a backup application).

Figure 10:
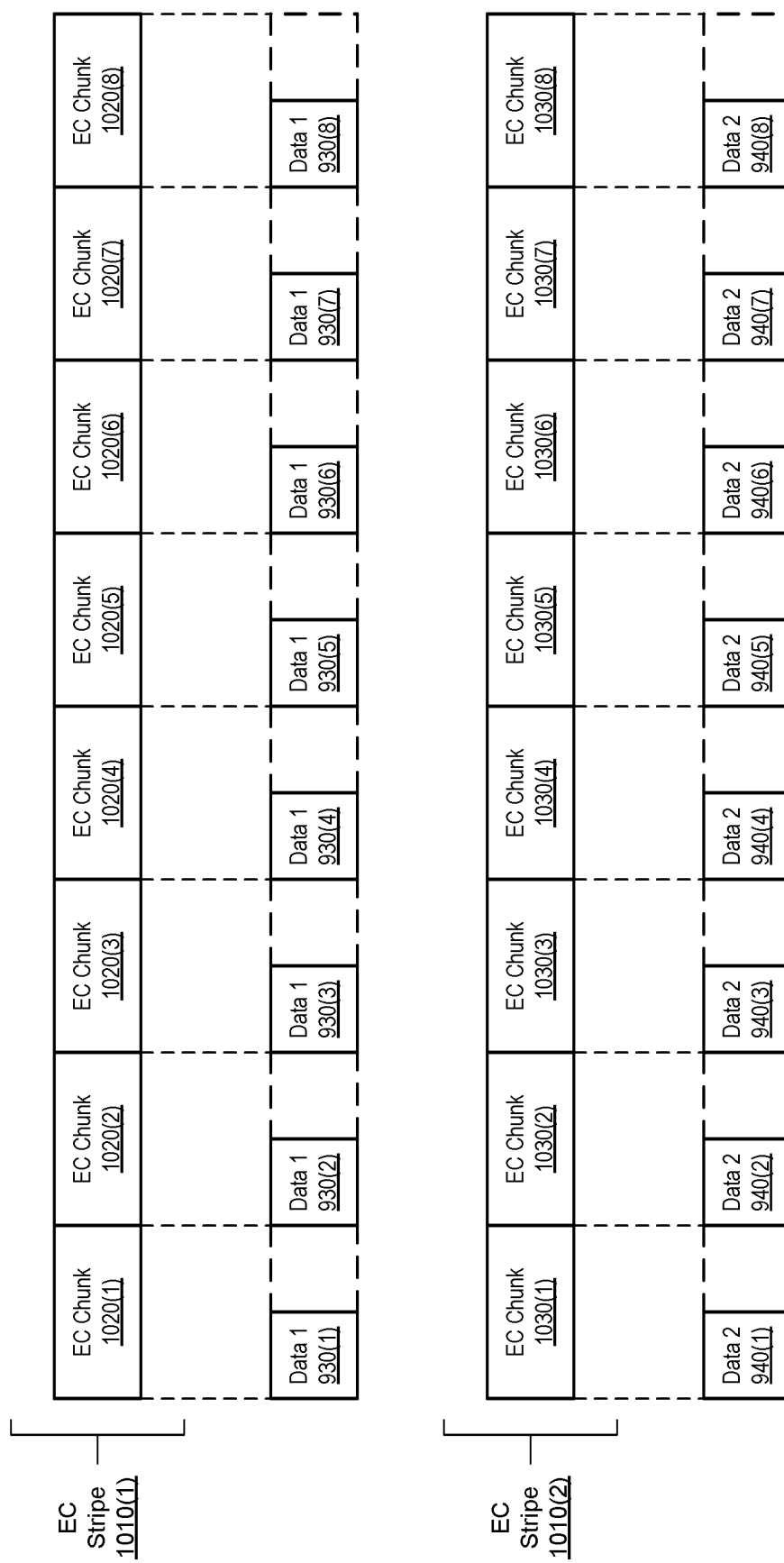
FIG. 10 is a simplified block diagram illustrating an example of the storage of data in erasure-coded storage, according to embodiments of methods and systems such as those disclosed herein.

FIG. 10 is a simplified block diagram illustrating an example of the storage of backup data in erasure-coded (EC) storage, according to embodiments of methods and systems such as those disclosed herein. As before, with regard to FIG. 9, the data of backups Data 1 and Data 2 are stored in EC storage. However, in order to avoid the aforementioned problems, they are data is stored on two different EC stripes (depicted in FIG. 10 as EC stripes 1010(1) and 1010(2), and referred to in the aggregate as EC stripes 1010). Thus, EC stripe 1010(1) includes a number of EC chunks (depicted in FIG. 10 as EC chunks 1020(1)-(8), and referred to in the aggregate as EC chunks 1020), while EC stripe 1010(2) includes a number of EC chunks (depicted in FIG. 10 as EC chunks 1030(1)-(8), and referred to in the aggregate as EC chunks 1030). In the arrangement depicted in FIG. 10, the data of the first backup (Data 1 930(1)-(8)) is stored in EC stripe 1010(1). However, the data of the second backup (Data 2 940(1)-(8)) is stored in a second EC stripe, EC stripe 1010(2). In so doing, the possibility of a failure in the writing of the second backup's data corrupting the first backup's data is avoided. In practical terms, using the aforementioned backup system as an example, it will be appreciated that when using EC storage systems, neither files (e.g., container metadata files and container data files), nor transactions (e.g., sets of segment metadata blocks) should be stored such that any ones of the foregoing Sharon EC stripe with any other of the foregoing. The discussions that follow provide examples of techniques for addressing such needs.

Figure 11:
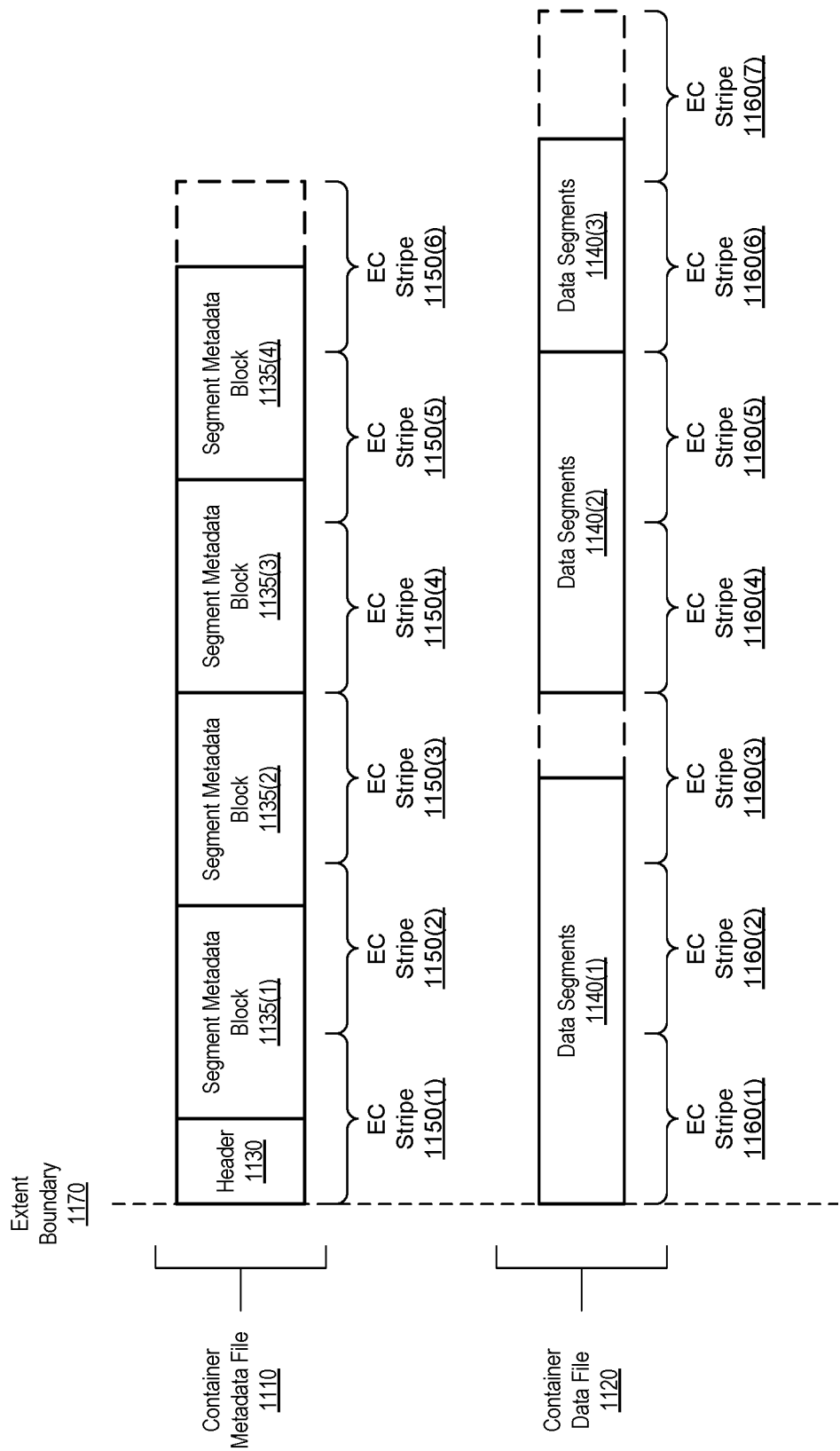
FIG. 11 is a simplified block diagram illustrating an example of the storage of data in erasure-coded storage, according to embodiments of methods and systems such as those disclosed herein.

FIG. 11 is a simplified block diagram illustrating an example of the storage of backup data in erasure-coded (EC) storage, according to embodiments of methods and systems such as those disclosed herein. While approaches such as that described in connection with FIG. 10 address the need to avoid corruption of existing data that is assumed to be successfully stored (e.g., existing backup data), and thus able to be made available, even in the face of some tolerable number of failures, the need to ensure such availability by way of separating such aggregations of data remains. In order to provide such functionality, an approach such as that depicted in FIG. 11 can be employed. FIG. 11 depicts the storage of a container metadata file 1110 and a container data file 1120 in EC storage. In turn, container metadata file 1110 includes a header 1130 and a number of segment metadata blocks, which are depicted in FIG. 11 as segment metadata blocks 1135(1)-(4) (and which are referred to in the aggregate as segment metadata blocks 1135), in the manner of the container metadata files described previously. Similarly, container data file 1120 includes a number of data segments, which are depicted in FIG. 11 as data segments 1140(1)-(3) (and which are referred to in the aggregate as data segments 1140), in the manner of the container data files described previously. It is to be appreciated that, as depicted in FIG. 11, each of data segments 1140(1), data segments 1140(2), and data segments 1140(3) can be single data segments, sets of data segments (i.e., more than one data segment), and/or a combination thereof. However, it is also to be appreciated that the storage of each of data segments 1140(1), data segments 1140(2), and data segments 1140(3) is a transactionally-separate operation, such that the success or failure of storage of one does not affect the storage of another from an erasure-coded storage standpoint. By forcing each such transactionally-separate operation to begin on another EC stripe, such isolation can be achieved.

Container metadata file 1110 and container data file 1120 are stored in EC storage. Such EC storage can include, for example, a number of EC stripes. Container metadata file 1110 is thus stored in EC stripes 1150(1)-(6), and the data segments of container data file 1120 are stored in EC stripes 1160(1)-(7). In order to prevent a data object such as a file (and so container metadata file 1110 and container data file 1120) from becoming corrupted, and so suffering from problems such as those mentioned earlier, the beginning of such files can be forced onto an EC stripe boundary. In so doing, the possibility of such a file sharing an EC stripe with another file (e.g., of another backup) is avoided.

Figure 12A:
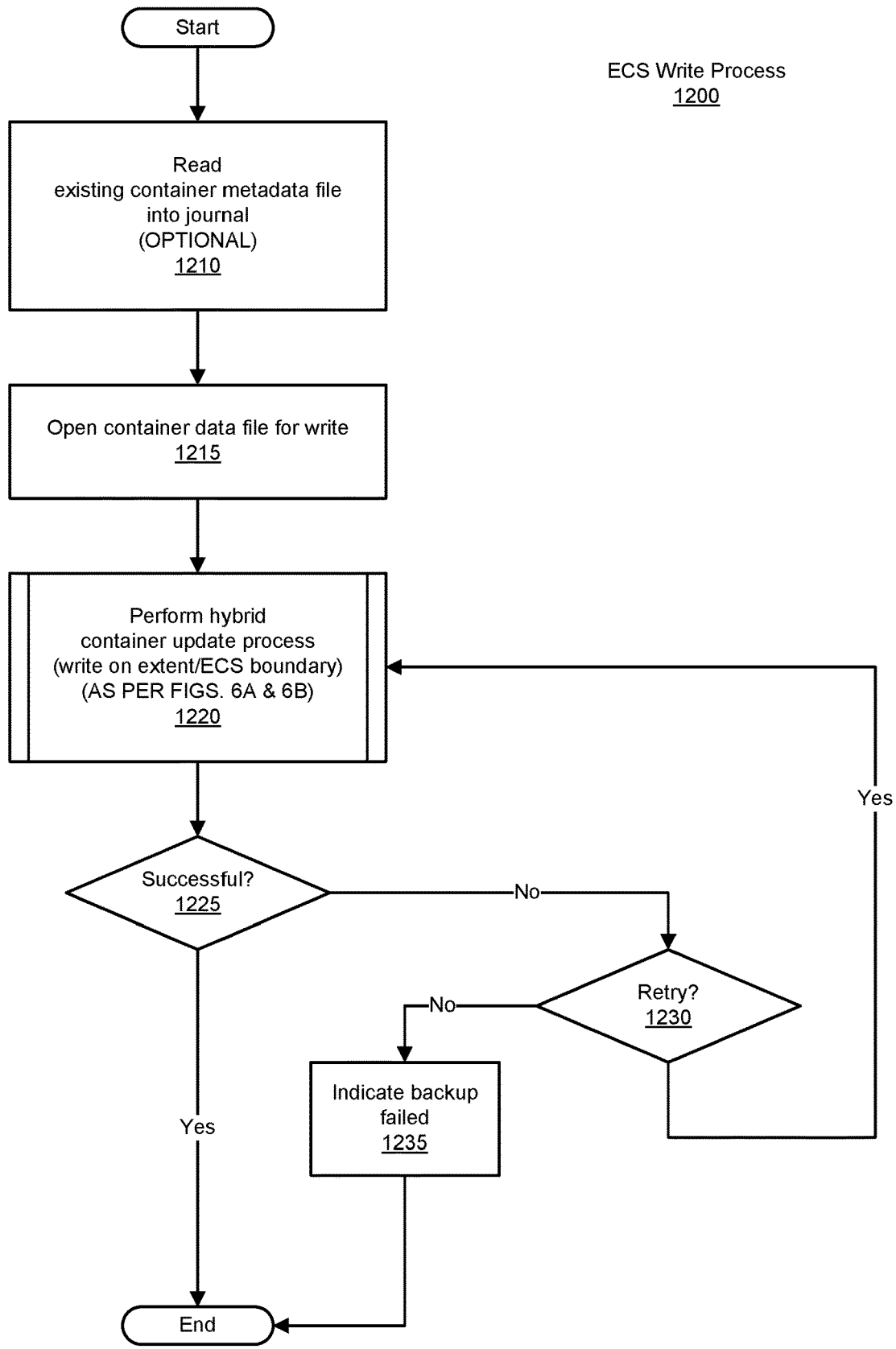
FIG. 12A is a flow diagram illustrating an example of an ECS write process, according to embodiments of methods and systems such as those disclosed herein.

FIG. 12A is a flow diagram illustrating an example of an ECS write process, according to embodiments of methods and systems such as those disclosed herein. That being the case, FIG. 12A depicts an ECS write process 1200, which can be employed, for example, when storing the deduplicated data of a backup in an erasure-coded storage system. ECS write process 1200 begins by reading an existing container metadata file into a journal (1210), though doing so is optional, as is noted. As noted earlier, maintaining a journal of the original state of such container metadata, as well as any changes thereto, allows such container metadata to be written to EC storage without risk to the integrity thereof. Thus, while such journaling does involve writing such information twice (once to the storage system, and once to the journal), the amount of overhead encountered is relatively small (given the relatively small amount of information involved) and such journaling allows the writing of such journal information to be performed in a transactional manner. As noted elsewhere herein, this provides the benefit of a success/failure decision to be made, and so the operation to be retried.

By contrast, data to be written to a container data file is not journal, according to embodiments such as those described herein. This is due to the relatively large amount of information stored in such container data files, and the overhead that would be involved in such journaling. However, the writing of such container data files (whether the original writing of the container data file, or the appending of information into a container data file) can be performed on a transactional basis, allowing the addition of such information (or its appending) into a container data file on a transactional basis. That being the case, in order to avoid the problems described previously, the creation of the container data file, as well as the appending of information (e.g., data segments), should be performed on an EC stripe boundary (ECSB). By ensuring that a container file that is created, is created starting on an ECSB (an operation which is performed on a transactional basis), and the appending of data into a container file is also performed on an ECSB (an operation which is also performed on a transactional basis), problems resulting from multiple files and/or multiple data segment sets being stored, at least in part, in a single EC stripe (i.e., sharing a single EC stripe, with portions of two or more such files and/or data segment sets occupying the same EC stripe), can be avoided.

With regard to ECS write process 1200, if the container data file does not exist, the container data file can be created, or if the container file exists, the container data file can be opened for write operations (1215). It will be appreciated that opening a container data file for additional write operations (e.g., append operations) is desirable from a system performance perspective, in comparison to writing a new container data file at each instance (at least because the proliferation of files in a file system can be detrimental to file system performance). Metrics that include current container data file size, amount of data to be stored, and other such characteristics of the given situation can be considered when making this determination as to whether to create a new container or append the data segments in question to an existing container (e.g., as by opening the container's container data file and appending data segments therein). A hybrid container update process such as that depicted as backup process 600 in FIGS. 6A and 6B can then be performed (1220). It will be appreciated in light of present disclosure that a process such as backup process 600 can be characterized as "hybrid," in that such a process performs journaling of some of the information stored, while writing other of the information to the storage system without journaling. It will be further appreciated in light of present disclosure that, in terms of ECS write process 1200, such the writing of data is performed starting at the ECSB of the next available (or at least, available) EC stripe. In this regard, it will be appreciated that, as noted earlier, when appending a span of data (a data span; for example, multiple data segments making up a set of data segments) to an existing container data file, the writing of such a data span (which can be a single data segment or multiple data segments begins on an ECSB, as noted. It is to be appreciated that, in the case in which the data span includes multiple data segments, the first data segment is written on the appropriate ECSB, and then the remaining data segments written contiguously thereafter, until the data segments of the data span are written. As noted, then, the potential for the last data segment ending in the middle of an extent/ECS stripe does not pose a problem (and avoids any risk thereto), given that the next append or container data/metadata file will start in another ECS stripe (at that ECS stripes ECSB). In so doing, such a process avoids writing information to an EC stripe that already stores information persisted to the ECS system.

As noted elsewhere herein, the writing of information to an ECS system can be forced to begin on an ECSB, whether creating the file in question or appending information thereto. For example, a file system can be configured with its smallest unit of storage equal in size to an integer multiple of the EC stripe size. Given that a file system's smallest unit of storage will be allotted to the storage of information in integer multiples thereof, equating such units of storage with some integer multiple of EC stripes results in writes to storage objects stored by the file system (e.g., files and information appended thereto) to be on EC stripe boundaries. For example, a file system based on extents (i.e., a standard minimum amount of data handled by such a file system) can have its extent size set to an integer multiple of the EC stripe size of the given ECS system. Thus, as is depicted in ECS write process 1200, metadata such as container metadata is read, updates and/or append operations performed thereon, the resulting metadata journaled, and then written to the (EC) storage system. It should be noted here that the information in the container metadata file (e.g., the container metadata file header and one or more segment metadata blocks) need not be aligned internally with regard to EC stripe boundaries. Given that the writing of the file will occur on an EC stripe boundary, the writing of the container metadata file can be treated as transactional in nature, given that the container metadata file is journaled and in the event of a failure such a storage operation can simply be restarted using that journaled copy. It will also be appreciated that, in terms of compaction or other such reclamation operations, the sets of data segments in a given container, once read, will also begin on an EC stripe boundary, and so be treated as being transactional in nature, with the attendant advantages thereof.

Using backup process 600 as an example, ECS write process 1200 then determines if the storage operations in question were successful (1225). Such information can be received, as the result of operations such as indications as to the backup operation's success (690) or failure (635 or 665). If the hybrid container update process was successful, ECS write process 1200 concludes. Alternatively, if the hybrid container update process was unsuccessful, a determination can be made as to whether that process should be retried (1230). If the hybrid container update process is to be retried, ECS write process 1200 loops to (again) attempt to perform the hybrid container update process (1220). If the hybrid container update process will not be retried, an indication is made to the effect that the backup has failed (1235), and ECS write process 1200 concludes.

Figure 12B:
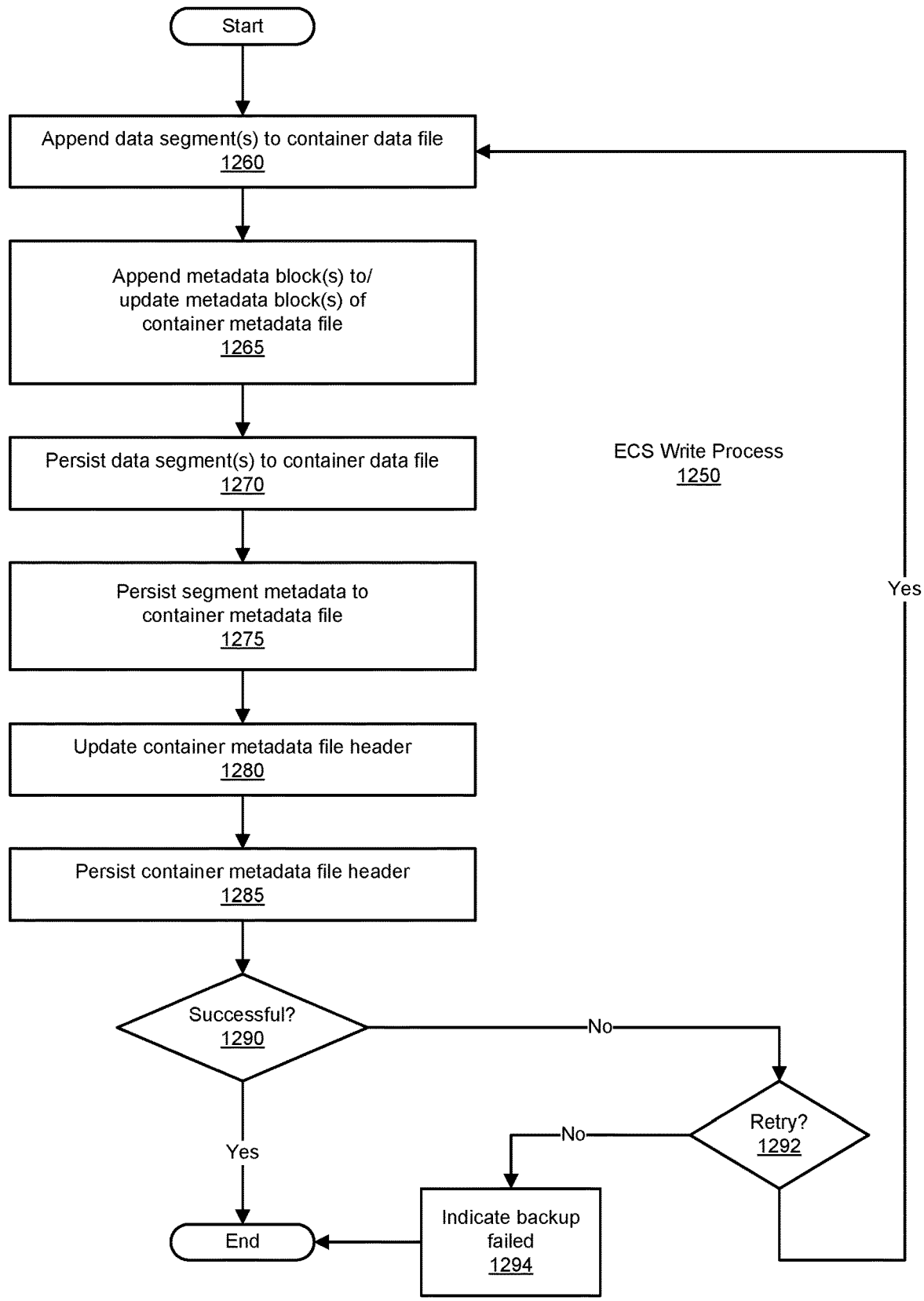
FIG. 12B is a flow diagram illustrating another example of an ECS write process, according to embodiments of methods and systems such as those disclosed herein.

FIG. 12B is a flow diagram illustrating another example of an ECS write process, according to embodiments of methods and systems such as those disclosed herein. That being the case, FIG. 12B depicts an ECS write process 1250, which can be employed, for example, when storing the deduplicated data of a backup in an erasure-coded storage system. ECS write process 1250 provides an example of a more generic process according to embodiments such as those disclosed herein. Once one or more data segments and their associated metadata are identified, ECS write process 1250 begins with the appending of one or more data segments to a container data file (1260). Similarly, one or more metadata blocks are appended to the container metadata file in question, or the existing metadata blocks of the container metadata file updated (1265). The data segments in question are persisted to the appropriate container data file (1270). As has been noted, when performed on an EC volume of an ECS system, such appended operations can be treated as transactional in nature by ensuring that such data segments are EC-stripe-aligned. Similarly, the one or more metadata blocks in question are persisted to the appropriate container metadata file (1275). The persisting of such metadata (which may include one or more updates and/or one or more append operations) can also be treated as transactional in nature. Such is the case because the metadata has been journaled, and so, if only partially written, such persisting can be retried using the journaled copy of the metadata. At this juncture (or in parallel there with), the container's container metadata file header is updated (1280). The container metadata file header can then be persisted (1285). The persisting of the container metadata file header can be treated as being transactional in nature by, for example, allocating the container metadata file header such that it's persisting is an atomic operation (e.g., by making the container metadata file header equal to one sector of data storage, certain storage systems can guarantee that the writing of such information will be atomic). Here again, the operation can therefor be treated as being transactional in nature, with the accompanying ability to treat such an operation as succeeding/failing and to retry the operation (or the entire backup operation), in the latter case. In fact, should any of the foregoing operations of ECS write process 1250 fail, the backup operation being performed can also be failed, and retried, if appropriate. Thus, as before, if ECS write process 1250 is successful (1290), ECS write process 1250 concludes. Alternatively, if one or more of the operations of ECS write process 1250 have failed (1290), a determination can be made as to whether ECS write process 1250 should be retried (1292). If, after encountering a failure, ECS write process 1250 will not be retried, an indication is made that the backup has failed (1294).

An Example Computing and Network Environment

As shown above, the systems described herein can be implemented using a variety of computer systems and networks. Examples of such computing and network environments are described below with reference to FIGS. 13 and 14.

Figure 13:
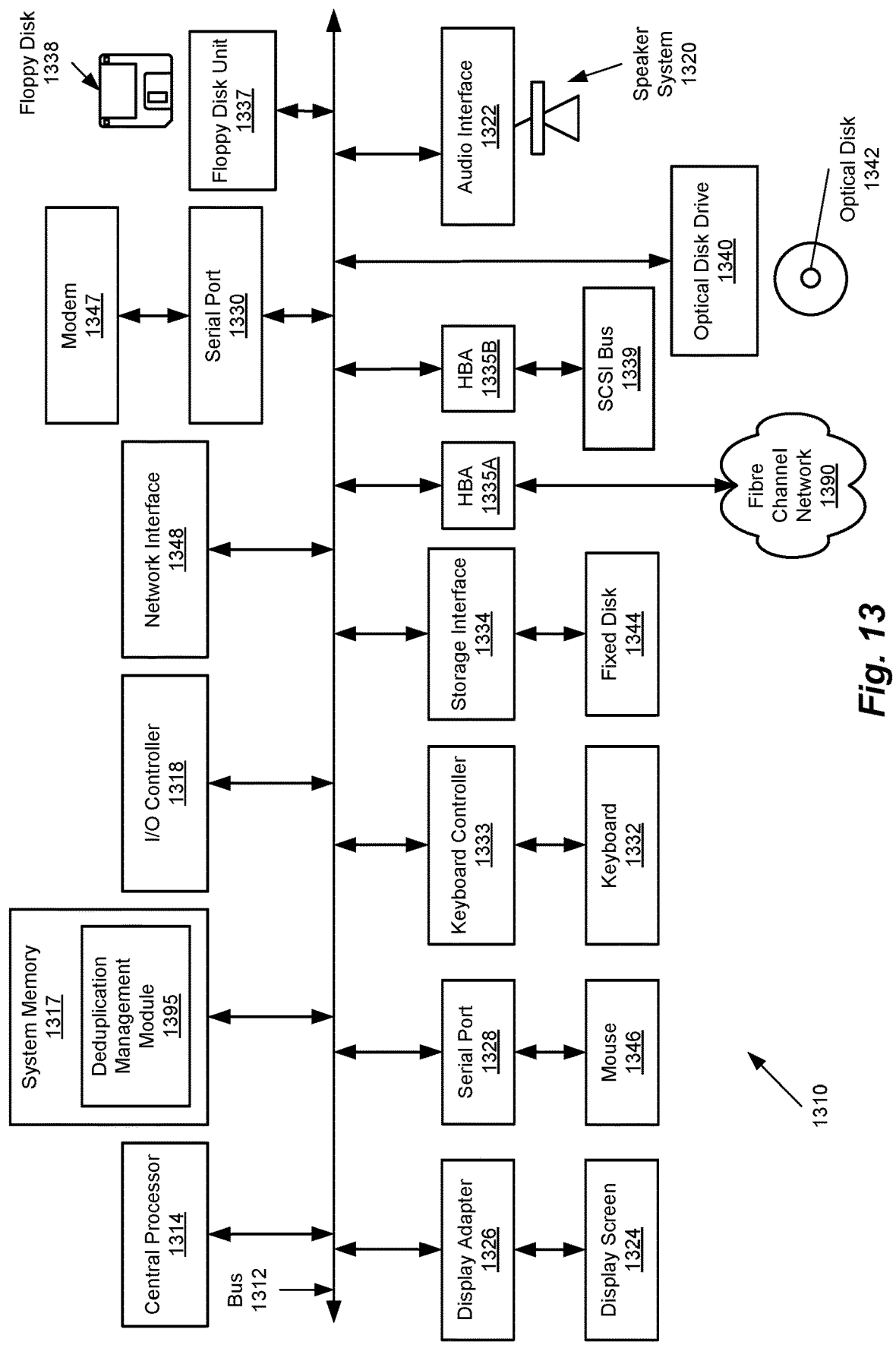
FIG. 13 is a block diagram depicting a computer system suitable for implementing embodiments of methods and systems such as those disclosed herein.

FIG. 13 depicts a block diagram of a computer system 1310 suitable for implementing aspects of the systems described herein. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1314 and system memory 1317, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1310 are generally stored on and accessed from a computer-readable storage medium, such as a hard disk drive (e.g., fixed disk 1344), an optical drive (e.g., optical drive 1340), a floppy disk unit 1337, or other computer-readable storage medium.

Storage interface 1334, as with the other storage interfaces of computer system 1310, can connect to a standard computer-readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like. Also depicted as part of computer system 1310 is a deduplication management module 1395, which is resident in system memory 1317 and is comparable in function and operation to the deduplication management modules described earlier herein.

Many other devices or subsystems (not shown) may be connected in a similar manner (e.g., document scanners, digital cameras and so on). Conversely, all of the devices shown in FIG. 13 need not be present to practice the systems described herein. The devices and subsystems can be interconnected in different ways from that shown in FIG. 13. The operation of a computer system such as that shown in FIG. 13 is readily known in the art and is not discussed in detail in this application. Code to implement the modules of the systems described herein can be stored in computer-readable storage media such as one or more of system memory 1317, fixed disk 1344, optical disk 1342, or floppy disk 1338. The operating system provided on computer system 1310 may be MS-DOS, MS-WINDOWS, UNIX, LINUX, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 14:
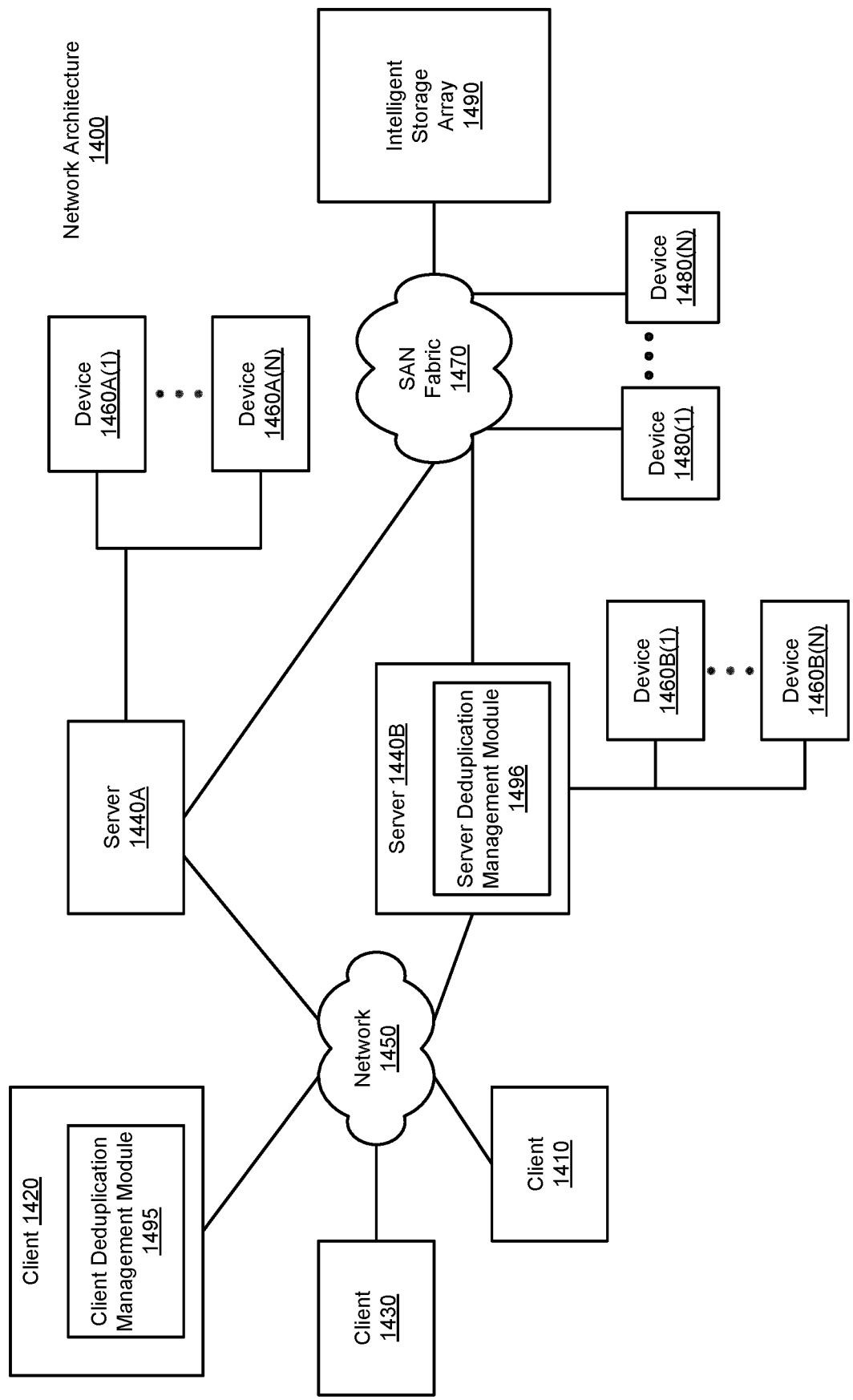
FIG. 14 is a block diagram depicting a network architecture suitable for implementing embodiments of methods and systems such as those disclosed herein.

FIG. 14 is a block diagram depicting a network architecture 1400 in which client systems 1410, 1420 and 1430, as well as storage servers 1440A and 1440B (any of which can be implemented using computer system 1410), are coupled to a network 1450. Storage server 1440A is further depicted as having storage devices 1460A(1)-(N) directly attached, and storage server 1440B is depicted with storage devices 1460B(1)-(N) directly attached. Storage servers 1440A and 1440B are also connected to a SAN fabric 1470, although connection to a storage area network is not required for operation. SAN fabric 1470 supports access to storage devices 1480(1)-(N) by storage servers 1440A and 1440B, and so by client systems 1410, 1420 and 1430 via network 1450. An intelligent storage array 1490 is also shown as an example of a specific storage device accessible via SAN fabric 1470.

Also depicted as part of network architecture 1400 are a client deduplication management module 1495 (installed in client 1420), and a server deduplication management module 1496 (installed in server 1440B), which are comparable in function and operation to various of the deduplication management modules described earlier herein.

With reference to computer system 1310, modem 1347, network interface 1348 or some other method can be used to provide connectivity from each of client computer systems 1410, 1420 and 1430 to network 1450. Client systems 1410, 1420 and 1430 are able to access information on storage server 1440A or 1440B using, for example, a web browser or other client software (not shown). Such a client allows client systems 1410, 1420 and 1430 to access data hosted by storage server 1440A or 1440B or one of storage devices 1460A(1)-(N), 1460B(1)-(N), 1480(1)-(N) or intelligent storage array 1490. FIG. 14 depicts the use of a network such as the Internet for exchanging data, but the systems described herein are not limited to the Internet or any particular network-based environment.

Other Embodiments

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method, implemented in a computer system, comprising:
   identifying a data segment;
   identifying metadata, wherein
      the metadata is associated with the data segment at least by virtue of the metadata comprising a fingerprint of the data segment;
   persisting the data segment to a storage system, wherein
      the storage system comprises erasure-coded storage,
      the persisting the data segment writes the data segment beginning at an erasure-coded stripe boundary in the erasure-coded storage, and
      the persisting the data segment to the storage system is performed without storing the data segment in a journal;
   storing the metadata in the journal; and
   persisting the metadata to the storage system.

2. The method of claim 1, further comprising:
   determining whether the data segment is a duplicate data segment;
   in response to the data segment being the duplicate data segment, updating existing metadata stored in the journal, wherein
      the existing metadata is associated with an existing data segment; and
   in response to the data segment not being the duplicate data segment, performing the persisting of the data segment, the storing of the metadata, and the persisting of the metadata.

3. The method of claim 1, wherein
   the persisting the data segment to the storage system stores the data segment in a container data file, and
   the persisting the metadata to the storage system stores the metadata in a container metadata file.

4. The method of claim 3, further comprising:
   opening the container data file; and
   appending another data segment to the container data file, wherein
      the appending comprises writing the another data segment to the container data file, and
      the writing the another data segment starts at another erasure-coded stripe boundary of the erasure-coded storage within the container data file.

5. The method of claim 3, wherein
   the erasure-coded storage is comprised in an erasure-coded storage system.

6. The method of claim 5, wherein
   the container data file is stored in the erasure-coded storage system such that the container data file begins at the erasure-coded stripe boundary.

7. The method of claim 5, wherein
   the persisting of the data segment stores the data segment at an erasure-coded stripe boundary of the erasure-coded storage within the container data file.

8. The method of claim 3, further comprising:
   updating a container metadata file header of the container metadata file, wherein
      a storage size of the container metadata file header is equal to a sector size of the storage system.

9. The method of claim 8, further comprising:
   persisting the container metadata file header into the container metadata file.

10. A computer program product comprising:
    a plurality of instructions, comprising
       a first set of instructions, executable by a processor of a computer system, configured to identify a data segment,
       a second set of instructions, executable by the processor, configured to identify metadata, wherein
          the metadata is associated with the data segment at least by virtue of the metadata comprising a fingerprint of the data segment,
       a third set of instructions, executable by the processor, configured to persist the data segment to a storage system, wherein
          the storage system comprises erasure-coded storage,
          the third set of instructions persists the data segment by causing writing of the data segment to begin at an erasure-coded stripe boundary in the erasure-coded storage, and
          the data segment is persisted to the storage system without storing the data segment in a journal,
       a fourth set of instructions, executable by a processor of a computer system, configured to store the metadata in the journal, and
       a fifth set of instructions, executable by a processor of a computer system, configured to persist the metadata to the storage system; and
    a non-transitory computer-readable storage medium, wherein the instructions are encoded in the non-transitory computer-readable storage medium.

11. The computer program product of claim 10, wherein the instructions further comprise:
    a sixth set of instructions, executable by the processor, configured to determine whether the data segment is a duplicate data segment;
    a seventh set of instructions, executable by the processor, configured to, in response to the data segment being the duplicate data segment, update existing metadata stored in the journal, wherein
       the existing metadata is associated with an existing data segment; and
    an eighth set of instructions, executable by the processor, configured to, in response to the data segment not being the duplicate data segment, cause execution of the third set of instructions, the fourth set of instructions, and the fifth set of instructions.

12. The computer program product of claim 10, further comprising:
a sixth set of instructions, executable by the processor, configured to open a container data file, wherein
the data segment is persisted to the storage system by storing the data segment in the container data file, and
the metadata is persisted to the storage system by storing the metadata in a container metadata file; and
a seventh set of instructions, executable by the processor, configured to append another data segment to the container data file, wherein
the another data segment is appended to the container data file by writing the another data segment to the container data file, and
the writing the another data segment starts at another erasure-coded stripe boundary of the erasure-coded storage within the container data file.

13. The computer program product of claim 10, wherein
the data segment is persisted to the storage system by storing the data segment in a container data file,
the metadata is persisted to the storage system by storing the metadata in a container metadata file, and
the erasure-coded storage is comprised in an erasure-coded storage system.

14. The computer program product of claim 13, wherein
the container data file is stored in the erasure-coded storage system such that the container data file begins at the erasure-coded stripe boundary.

15. The computer program product of claim 10, further comprising:
a sixth set of instructions, executable by the processor, configured to update a container metadata file header of a container metadata file, wherein
the data segment is persisted to the storage system by storing the data segment in a container data file,
the metadata is persisted to the storage system by storing the metadata in the container metadata file, and
a storage size of the container metadata file header is equal to a sector size of the storage system; and
a seventh set of instructions, executable by the processor, configured to persist the container metadata file header into the container metadata file.

16. A computer system comprising:
one or more processors;
a computer-readable storage medium coupled to the one or more processors; and
a plurality of instructions, encoded in the computer-readable storage medium and configured to cause the one or more processors to
identify a data segment,
identify metadata, wherein
the metadata is associated with the data segment at least by virtue of the metadata comprising a fingerprint of the data segment,
persist the data segment to a storage system, wherein
the storage system comprises erasure-coded storage,
the data segment is persisted by writing the data segment beginning at an erasure-coded stripe boundary in the erasure-coded storage, and
the data segment is persisted to the storage system without storing the data segment in a journal,
store the metadata in the journal, and
persist the metadata to the storage system.

17. The computer system of claim 16, wherein the plurality of instructions comprise further instructions configured to cause the one or more processors to:
determine whether the data segment is a duplicate data segment;
in response to the data segment being the duplicate data segment, update existing metadata stored in the journal, wherein
the existing metadata is associated with an existing data segment; and
the data segment not being the duplicate data segment, cause execution of the instructions configured to cause the one or more processors to persist the data segment, to store the metadata, and to persist the metadata.

18. The computer system of claim 16, wherein the plurality of instructions comprise further instructions configured to cause the one or more processors to:
open a container data file, wherein
the data segment is persisted to the storage system by storing the data segment in the container data file, and
the metadata is persisted to the storage system by storing the metadata in a container metadata file; and
append another data segment to the container data file, wherein
the another data segment is appended to the container data file by writing the another data segment to the container data file, and
the writing the another data segment starts at another erasure-coded stripe boundary of the erasure-coded storage within the container data file.

19. The computer system of claim 16, wherein
the data segment is persisted to the storage system by storing the data segment in a container data file,
the metadata is persisted to the storage system by storing the metadata in a container metadata file,
the erasure-coded storage is comprised in an erasure-coded storage system, and
the container data file is stored in the erasure-coded storage system such that the container data file begins at the erasure-coded stripe boundary.

20. The computer system of claim 16, wherein the plurality of instructions comprise further instructions configured to cause the one or more processors to:
update a container metadata file header of a container metadata file, wherein
the data segment is persisted to the storage system by storing the data segment in a container data file,
the metadata is persisted to the storage system by storing the metadata in the container metadata file, and
a storage size of the container metadata file header is equal to a sector size of the storage system; and
persist the container metadata file header into the container metadata file.

* * * * *